United States Patent
Kizaki et al.

(10) Patent No.: US 7,382,938 B2
(45) Date of Patent: Jun. 3, 2008

(54) IMAGE DATA STORING DEVICE, IMAGE PROCESSING APPARATUS INCLUDING THE SAME AND IMAGE DATA TRANSFER CONTROL METHOD

(75) Inventors: Osamu Kizaki, Saitama (JP); Yoh Masuyama, Kanagawa (JP); Ryonosuke Miyazaki, Tokyo (JP); Tsuyoshi Endoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 469 days.

(21) Appl. No.: 09/770,470

(22) Filed: Jan. 29, 2001

(65) Prior Publication Data

US 2002/0030853 A1    Mar. 14, 2002

(30) Foreign Application Priority Data

Jan. 28, 2000   (JP)   ............................. 2000-019649
Mar. 24, 2000   (JP)   ............................. 2000-084844

(51) Int. Cl.
*G06K 9/54*  (2006.01)
*G06K 9/60*  (2006.01)

(52) U.S. Cl. ..................... 382/305; 382/307; 382/306
(58) Field of Classification Search ......... 382/305–307
See application file for complete search history.

(56) References Cited

U.S. PATENT DOCUMENTS

| | | | |
|---|---|---|---|
| 5,063,459 A * | 11/1991 | Nakatani et al. | ............ 358/404 |
| 5,379,124 A * | 1/1995 | Ikegaya et al. | ............. 358/440 |
| 5,434,650 A | 7/1995 | Nakahara et al. | |
| 5,465,172 A * | 11/1995 | Fukushima et al. | ......... 358/498 |
| 5,485,246 A | 1/1996 | Hayashi et al. | |
| 5,510,876 A | 4/1996 | Hayashi et al. | |
| 5,546,164 A | 8/1996 | Hayashi et al. | |
| 5,583,615 A | 12/1996 | Hashimoto et al. | |
| 5,648,816 A * | 7/1997 | Wakui | ..................... 348/231.9 |
| 5,694,201 A | 12/1997 | Hayashi et al. | |
| 5,742,339 A * | 4/1998 | Wakui | ..................... 348/231.9 |
| 5,784,663 A | 7/1998 | Hayashi et al. | |
| 5,812,900 A | 9/1998 | Hashimoto et al. | |

(Continued)

OTHER PUBLICATIONS

U.S. Appl. No. 09/770,470, filed Jan. 29, 2001, Kizaki et al.

(Continued)

*Primary Examiner*—Matthew C. Bella
*Assistant Examiner*—Wes Tucker
(74) *Attorney, Agent, or Firm*—Oblon, Spivak, McClelland, Maier & Neustadt, P.C.

(57) ABSTRACT

In an image processing apparatus, a limit check procedure compares a capacity necessary for storing designated image files to be transferred and the residual memory capacity of a destination to which the image files should be transferred. The procedure determines whether or not the transfer of the image files is allowable on the basis of the result of comparison. This procedure is executed before and during the transfer of image files. The procedure executed before transfer obviates transfer failure when the image files are transferred to an external storage implemented by a CD-R or similar write limiting type of storing medium; in this case, the procedure is not necessary during transfer. In the event of transfer to a work memory built in the apparatus, even if transfer is allowed before transfer, the procedure is executed during transfer in order to produce an alarm when transfer becomes unallowable.

59 Claims, 35 Drawing Sheets

U.S. PATENT DOCUMENTS

| | | | |
|---|---|---|---|
| 5,821,996 A * | 10/1998 | Kawamura et al. | 348/231.6 |
| 5,854,693 A * | 12/1998 | Yoshiura et al. | 358/468 |
| 5,897,236 A | 4/1999 | Hashimoto et al. | |
| 5,915,156 A | 6/1999 | Kizaki et al. | |
| 5,966,564 A | 10/1999 | Kizaki et al. | |
| 6,026,255 A | 2/2000 | Kizaki et al. | |
| 6,094,219 A * | 7/2000 | Roberts et al. | 348/220.1 |
| 6,122,457 A | 9/2000 | Kizaki | |
| 6,239,837 B1 * | 5/2001 | Yamada et al. | 348/231.5 |
| 6,437,786 B1 * | 8/2002 | Yasukawa | 345/474 |
| 6,661,454 B1 * | 12/2003 | Hwang et al. | 348/231.1 |
| 6,678,801 B1 * | 1/2004 | Greim et al. | 711/148 |

OTHER PUBLICATIONS

U.S. Appl. No. 10/692,792, filed Oct. 27, 2003, Kizaki et al.
U.S. Appl. No. 10/694,062, filed Oct. 28, 2003, Kizaki et al.
U.S. Appl. No. 10/667,302, filed Sep. 23, 2003, Shindoh et al.
U.S. Appl. No. 10/849,827, filed May 21, 2004, Kizaki et al.

* cited by examiner

Fig. 18

| DOCUMENT NAME | USER ID | TIME OF STORAGE | NUMBER OF PAGES | SIZE |
|---|---|---|---|---|
| Prt003 | TANAKA | 9/8 11:24 | 100 | 68 |
| TEST | | 9/10 9:17 | 20 | 17 |
| | | | | |
| | | | | |
| | | | | |
| | | | | |
| | | | | |
| | | | | |

PAGE 1/1

TRANS FILE MEM : 38
LEFT MEM SIZE : 50

RETURN TO FILE LIST

SEARCH  DISPLAY DOCUMENT

TRANSFERRED REDESIGNATED FILES.
NOT TRANSFERRED CANCELLED FILES LISTED HERE.

OK

◀ UP  ▼ DOWN

《 DOCUMENT MANAGEMENT 》

<< DOCUMENT MANAGEMENT >>

| SEARCH | | DISPLAY DOCUMENT | | | PAGE 1/1 | | TRANS FILE MEM : 38 LEFT MEM SIZE : 50 | RETURN TO FILE LIST |

| DOCUMENT NAME | USER ID | TIME OF STORAGE ▽ ▼ | NUMBER OF PAGES | SIZE |
|---|---|---|---|---|
| Prt002 | TANAKA | 9/8 10:30 | 10 | 7 |
| Prt003 | TANAKA | 9/8 11:24 | 100 | 68 |
| REPORT | IKEDA | 9/11 13:20 | 18 | 14 |
| TEST | IKEDA | 9/10 9:17 | 20 | 17 |
| PICS | JEFF | 9/20 6:10 | 3 | 22 |
| | | | | |
| | | | | |
| | | | | |

TRANSFER OF DESIGNATED FILES FAILED DUE TO SHORT MEMORY SIZE OF DESIGNATION.

READY TO TRANSFER FILES IF YOU REDUCE NUMBER OF FILES.

TRANSFER

▲ UP
▼ DOWN

Fig. 25

<< DOCUMENT MANAGEMENT >>

| SEARCH | | DISPLAY DOCUMENT | | | PAGE 1/1 | TRANS FILE MEM : 38 LEFT MEM SIZE : 50 | RETURN TO FILE LIST |

| DOCUMENT NAME | USER ID | TIME OF STORAGE ▼△ | NUMBER OF PAGES | SIZE |
|---|---|---|---|---|
| Prt002 | TANAKA | 9/8 10:30 | 10 | 7 |
| Prt003 | TANAKA | 9/8 11:24 | 100 | 68 |
| REPORT | IKEDA | 9/1 13:20 | 18 | 14 |
| TEST | JEFF | 9/10 9:17 | 20 | 17 |
| PICT | JEFF | 9/20 6:10 | 3 | 22 |
| | | | | |
| | | | | |
| | | | | |

TRANSFER OF DESIGNATED FILES FAILED DUE TO SHORT MEMORY SIZE OF DESTINATION.

READY TO TRANSFER FILES IN CONDITION SHOWN LEFT.

[TRANSFER]

◀ UP
▼ DOWN

Fig. 27
| Fig.27A |
|---------|
| Fig.27B |
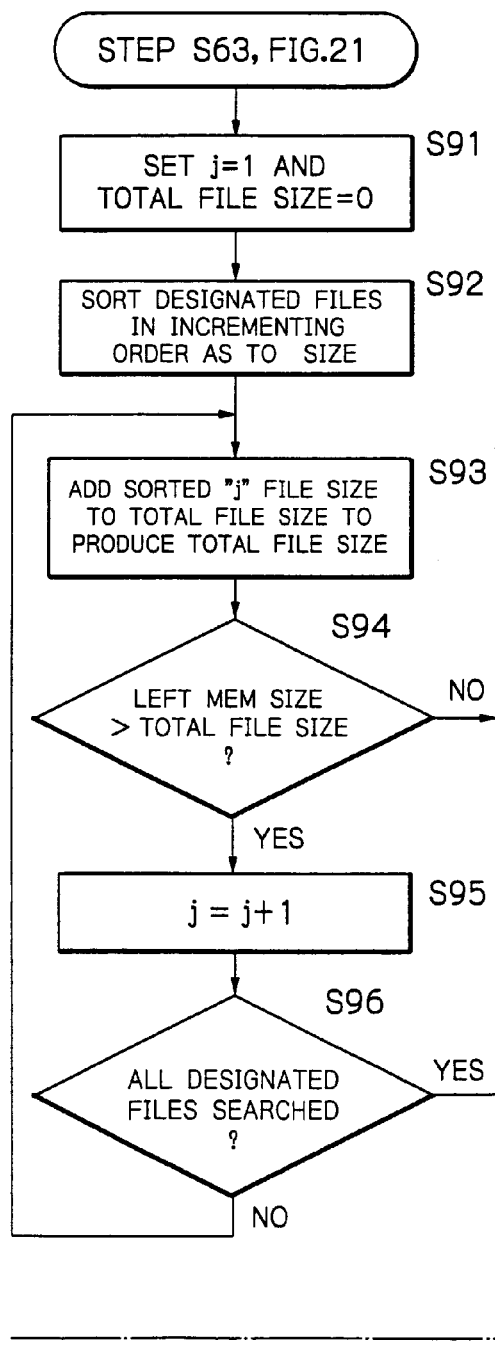
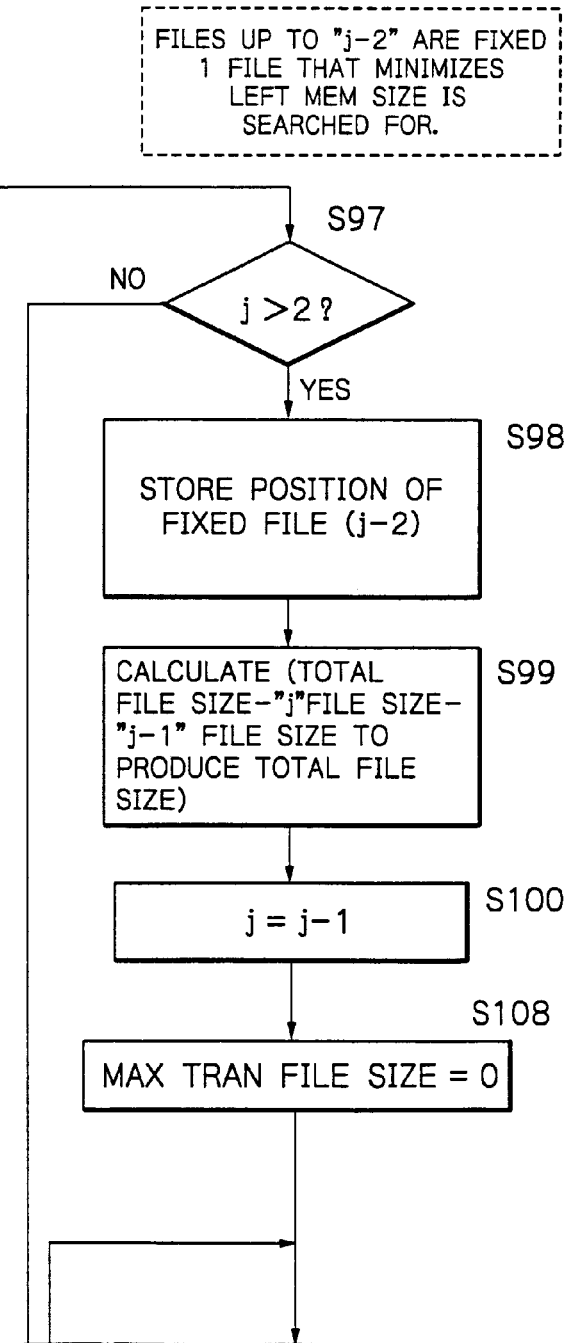
*Fig. 27A*

Fig. 28

《 DOCUMENT MANAGEMENT 》 | :IN. DOCUMENT: | EX. DOCUMENT

| SEARCH | | DISPLAY DOCUMENT | | EX. MEMORY LEFT 3330/4734 | | PAGE 1/1 | |
|---|---|---|---|---|---|---|---|

| DOCUMENT NAME | USER ID | TIME OF STORAGE | NUMBER OF PAGES | SIZE | SELECTION ORDER |
|---|---|---|---|---|---|
| Prt001 | TANAKA | 9/8 10:05 | 5 | 3 | |
| Prt002 | TANAKA | 9/8 10:30 | 10 | 20 | 1 |
| Prt003 | TANAKA | 9/8 11:24 | 100 | 40 | 3 |
| Prt004 | TANAKA | 9/8 16:05 | 15 | 20 | 4 |
| REPORT | IKEDA | 9/10 8:20 | 18 | 14 | |
| TEST | | 9/10 9:17 | 20 | 30 | 2 |
| REPI | MIKE | 9/11 8:00 | 3 | 1 | |
| PICS | JEFF | 9/20 6:10 | 3 | 22 | |

◀ UP ▼ DOWN

CHANGE DOCUMENT NAME

CONNECT DOCUMENT

INSERT DOCUMENT

DELETE PAGE

DELETE FROM LIST

EX. MEMORY LEFT 70/6000

SHIFT DOCUMENT TO (EX. MEMORY)

Fig. 29

<< DOCUMENT MANAGEMENT >> | | | | | | RETURN TO FILE LIST

| SEARCH | | DISPLAY DOCUMENT | | | | | TRANS FILE MEM : 38!<br>LEFT MEM SIZE : 50! |
| --- | --- | --- | --- | --- | --- | --- | --- |

TRANSFER OF DESIGNATED FILES FAILED DUE TO SHORT MEMORY SIZE OF DESTINATION.

READY TO TRANSFER FILES IF YOU REDUCE NUMBER OF FILES.

PAGE 1/1

| DOCUMENT NAME | USER ID | TIME OF STORAGE | NUMBER OF PAGES | SIZE | SELECTION ORDER |
| --- | --- | --- | --- | --- | --- |
| Prt002 | TANAKA | 9/8 10:30 | 10 | 20 | 1 |
| Prt003 | TANAKA | 9/8 11:24 | 100 | 40 | 3 |
| Prt004 | TANAKA | 9/8 16:05 | 15 | 20 | 4 |
| TEST | | 9/10 9:17 | 20 | 30 | 2 |
| | | | | | |
| | | | | | |
| | | | | | |
| | | | | | |

▲ UP   ▼ DOWN

TRANSFER

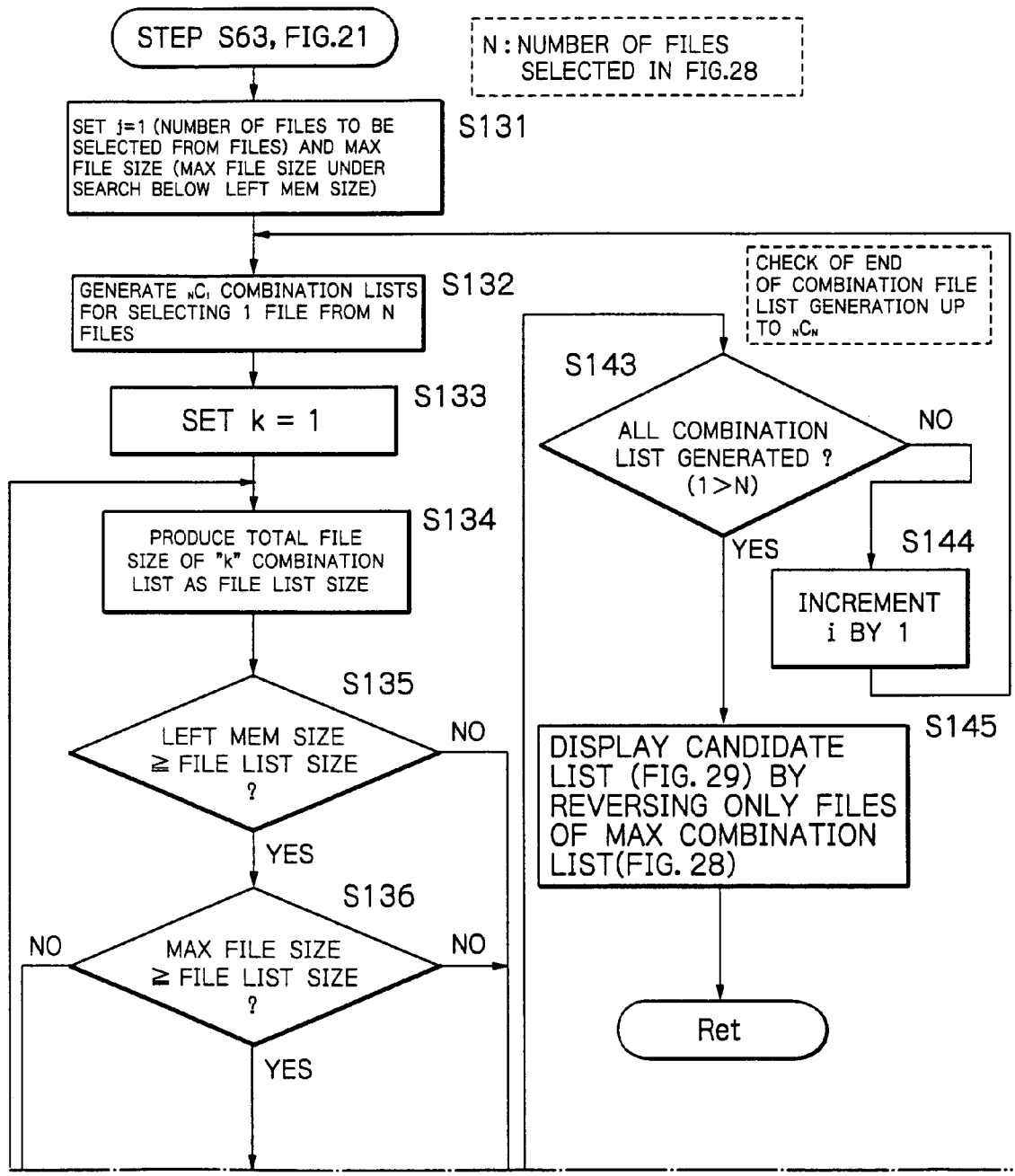

IMAGE DATA STORING DEVICE, IMAGE PROCESSING APPARATUS INCLUDING THE SAME AND IMAGE DATA TRANSFER CONTROL METHOD

BACKGROUND OF THE INVENTION

The present invention relates to an image processing apparatus for processing and storing image data. More particularly, the present invention relates to the transfer of image data between, e.g., a semiconductor memory, hard disk or similar storage built in an image processing apparatus and a storing device using a CD (Compact Disk) or similar storing medium.

Generally, an electronic filing apparatus, digital copier or similar image input/output apparatus includes an external storage that allows a recording medium to be removably mounted thereto. The recording medium is mainly implemented by a magnetooptical disk or an optical disk. An internal storage built in the apparatus is capable of storing image data representative of document images and output from, e.g., a scanner. When the image data are transferred from the internal storage to the external storage, a transfer system is essential that takes account of the capacity of the external storage capable of dealing with the total number of files and the limited number of times of writing particular to, e.g., a CD-R (Compact Disk-Recordable) or a CD-RW (CD ReWritable). A transfer system disregarding such limitations would cause image data to be written to the storing medium randomly, making the medium unusable due to the limited number of times of writing.

Further, when image data are transferred from the external storage to the internal storage, the following problem is given rise to. Usually, the internal storage does not have a capacity great enough to store mass image data. Moreover, the internal storage is implemented by a memory of the type allowing a plurality of write accesses to occur at the same time in the event of the storage of document image data or the processing of images. It follows that the transfer of mass image data from the external storage to the built-in storage fails.

SUMMARY OF THE INVENTION

It is therefore an object of the present invention to provide an image data storing device and an image data control method capable of obviating the failure of transfer of image data between an internal storage and an external storage, which uses a CD by way of example and does not allow a plurality of simultaneous write accesses, ascribable to a memory-full condition, free from wasteful storing operations, and promoting the efficient use of the storages.

It is another object of the present invention to provide an image data storing device and an image data transfer control method capable of obviating transfer failure by coping with limitations (residual number of files or residual memory capacity available) in the event of the transfer of designated image files or pages.

It is another object of the present invention to provide an image data storing device and an image data transfer control method capable of obviating, when one of storages is implemented by a removable storing medium (particularly a CD-R, CR-RW or similar write limiting type of storing medium), transfer failure by determining whether or not transfer is allowable in a particular optimal mode for each of write-in and read-out, and obviating wasteful write-in despite limitations on the storages to thereby promote the efficient use of the storages.

It is another object of the present invention to provide an image data storing device and an image data transfer control method capable of promoting easy operation in the event of file transfer or page transfer.

It is still another object of the present invention to provide an image data storing device and an image data transfer control method capable of enhancing file or page transfer performance.

It is yet another object of the present invention to provide an image processing apparatus including inputting means, which is implemented by an interface for receiving image data output from an image reading unit or from the outside of the apparatus, and an image forming device that forms an image in accordance with the above image data.

It is a further object of the present invention to provide a recording medium storing a program for executing the image transfer control method.

In accordance with the present invention, an image data storing device includes a plurality of storing devices configured to store image data input via an inputting device each. A transfer controller controls the transfer of the image data between the plurality of storing devices A checking device is included in the transfer controller for determining whether or not a storing device included in a destination, to which the image data should be transferred, has a capacity great enough to store the image data.

Also, in accordance with the present invention, an image processing apparatus includes an inputting device including an image data storing device, which includes an interface. The inputting device receives image data output from at least one of an image reading unit or the outside of the image processing apparatus. An image forming device forms an image in accordance with the image data output from the image data storing device. The image data storing device includes the above-described features.

BRIEF DESCRIPTION OF THE DRAWINGS

The above and other objects, features and advantages of the present invention will become more apparent from the following detailed description taken with the accompanying drawings in which:

FIG. 18 is a view showing a specific picture to appear after the transfer of image files;

FIG. 23 is a view showing a specific picture to appear after the picture of FIG. 22;

FIG. 25 is a view showing another specific picture to appear after the picture of FIG. 22;

FIG. 28 is a view showing a specific picture to appear in the event of designation of files and additionally including a selection order;

FIG. 29 is a view showing a specific picture to appear after the picture of FIG. 28;

DESCRIPTION OF THE PREFERRED EMBODIMENT

Figure 1:
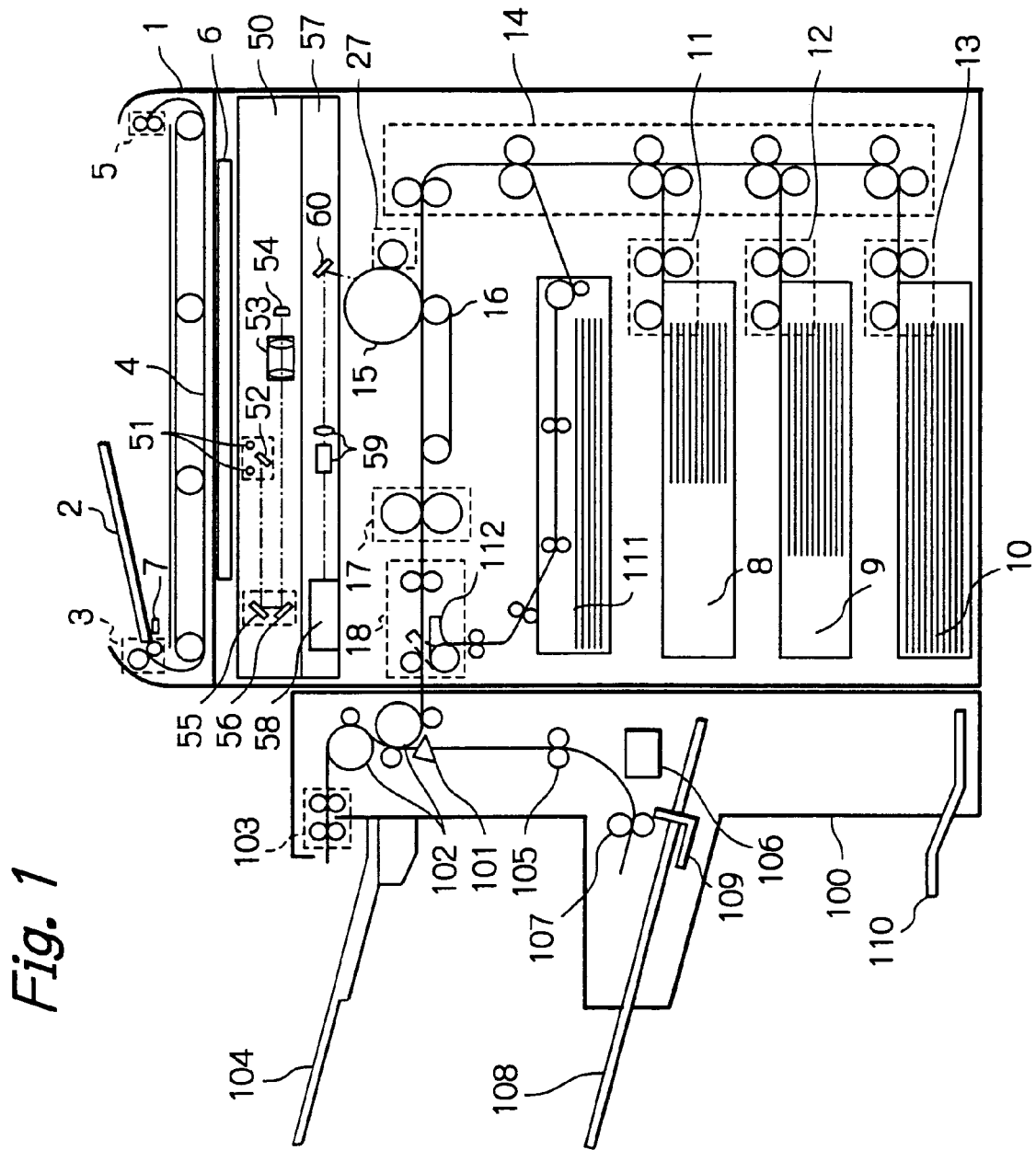
FIG. 1 is a view showing the general construction of an image processing apparatus embodying the present invention and implemented as a digital multifunction copier by way of example.

Referring to FIG. 1 of the drawings, an image processing apparatus embodying the present invention is shown and implemented as a digital multifunction copier by way of example. The copier or multiplex machine has a facsimile function, a printer function, an electronic filing function and other various functions in addition to a copier function.

As shown in FIG. 1, the copier includes an ADF (Automatic Document Feeder) 1. The operator of the copier stacks documents on a tray 2, which is included in the ADF 1, face up. The operator then presses a start key 34 positioned on an operation panel 30 (see FIG. 2). In response, a feed roller 3 and a belt 4 cooperate to sequentially feed the bottom document to the top document to a preselected position on a glass platen 6. At this instant, the copier counts the documents every time the feed of one document completes. A reading unit 50 reads the image of the document positioned on the glass platen 6. The belt 4 and a discharge roller 5 cooperate to discharge the document read by the reading unit 50. When a document sensor 7 senses another document present on the tray 2, the document is conveyed to the glass platen 6 in the same manner as the previous document. A conveyance motor 26 (see FIG. 3) drives the rollers 3 and 5 and belt 4.

A writing unit 57 includes a laser unit 58 that emits a laser beam in accordance with image data output from the reading unit 50. The laser beam scans the surface of a photoconductive drum 15, which is a specific form of a photoconductive element. As a result, a latent image representative of a document image is electrostatically formed on the drum 15. A developing unit 27 develops the latent image with toner to thereby form a corresponding toner image. While a belt 16 conveys a paper sheet, which is a specific form of a recording medium, at the same speed as the rotation of the drum 15, the toner image is transferred from the drum 15 to the paper sheet.

A first, a second and a third tray 8, 9 and 10 each are loaded with a stack of paper sheets. A first, a second and a third paper feeder 11, 12 and 13 feed the paper sheets from the first, second and third trays 8, 9 and 10, respectively. A vertical conveying unit 14 conveys the paper sheet fed from any one of the trays 8 through 10 to a position where the paper sheet contacts the drum 15. A fixing unit 17 fixes the toner image on the paper sheet. A paper discharging unit 18 discharges the paper sheet carrying the fixed image thereon to a finisher 100.

The finisher 100 selectively guides the paper sheet toward a print tray 104 or a staple tray 108. Specifically, a path selector 101 steers the paper sheet toward the print tray 104 via discharge rollers 103 when positioned upward or steers it toward the staple tray 108 via rollers 105 and 107 when positioned downward. Every time a paper sheet is driven out to the staple tray 108, a jogger 109 positions the edge of the paper sheet. When a single copy, i.e., a single set of copies is completed on the staple tray 108, a stapler 106 staples it. The stapled copy drops onto a tray 110 due to its own weight. The print tray 104 is movable in a direction perpendicular to the direction of paper conveyance for every document or for a copy automatically sorted by a video memory, thereby sorting prints.

In a duplex mode for forming images on both sides of a paper sheet, a path selector 112 is positioned upward. In this condition, the paper sheet fed from any one of the trays 8 through 10 and carrying an image on one side thereof is not steered toward the print tray 104, but is steered toward and laid on a refeeding unit 111. The refeeding unit 111 again feeds the paper sheet toward the drum 15, so that an image is formed on the other side of the paper sheet. At this instant, the path selector 112 is positioned downward in order to steer the above paper sheet, or duplex print, toward the print tray 104.

A main motor 25 (see FIG. 3) drives the drum 15, belt 16, fixing unit 17, paper discharging unit 18, and developing unit 27. The rotation of the main motor is transferred to the paper feeders 11 through 13 via clutches. Also, the rotation of the main motor 25 is transferred to the paper feeders 11 through 13 via paper feed clutches 22 through 24 (see FIG. 3), respectively. Further, the rotation of the main motor 25 is transferred to the vertical conveying unit 14 via an intermediate clutch 21 (see FIG. 3).

Figure 2:
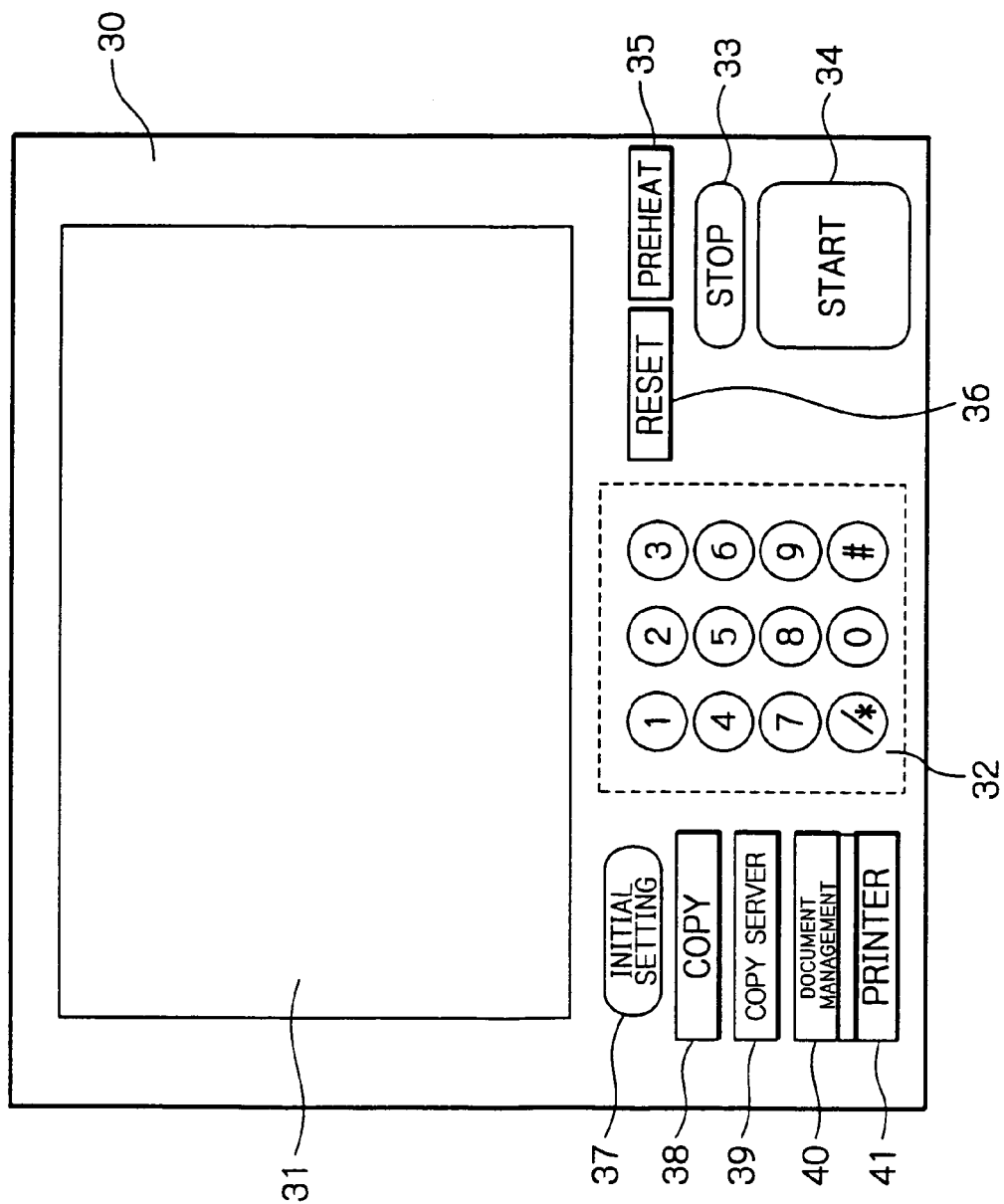
FIG. 2 is a plan view showing a specific configuration of an operation panel mounted on the copier of FIG. 1.

FIG. 2 shows a specific configuration of the operation panel 30 included in the illustrative embodiment. As shown, the operation panel 30 includes an LCD (Liquid Crystal Display) touch panel 31, numeral keys 32, a clear/stop key 33, a print key (start key) 34, a preheat key 35, a reset key 36, an initial set key 37, a copy key 38, a copy server key 39, a document key 40, and a printer key 41. The touch panel 31 displays function keys, the number of copies, messages representative of the statuses of the apparatus, and so forth.

By pressing the initial set key 37, it is possible to customize the initial conditions of the apparatus, as desired. With the key 67, it is also possible to set the sizes of paper sheets disposed in the apparatus or to set desired conditions to occur when a mode clear key, not shown, assigned to the copier function is pressed Further, the key 37 allows an application to be selected when the operation panel 30 is not operated over a preselected period of time to be set. In addition, the key 67 allows a transition time to a power saving state to be set or allows a transition time to an automatic off/sleep mode to be set.

The copier function is available when the copy key 28 is pressed.

The copy server key 39 is used to sore document images read by a scanner or images output from a host computer by the printer function or to print the stored images.

The document key 40 is used to edit, e.g., image data stored by the above copy server function, as will be described specifically later.

Figure 8:
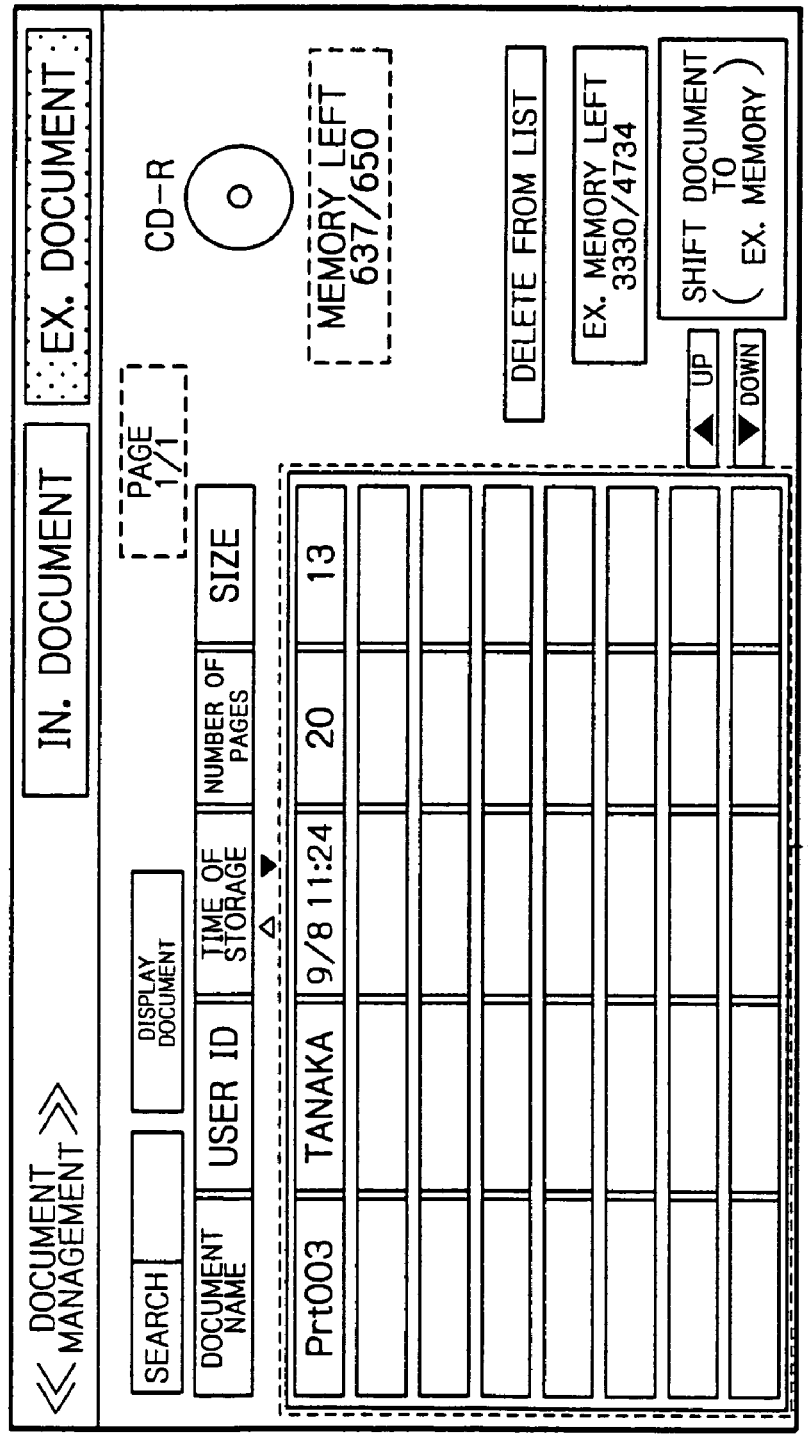
FIG. 8 is a view showing a specific picture for dealing with an external stored document.

FIG. 8 shows a specific picture to appear on the touch panel 31 of the operation panel 30, FIG. 2, when the document key 40 is pressed. When the operator touches desired one of keys appearing on the touch panel 31, the key touched is reversed in color. Assume that the operator desires to select a more specific function, e.g., to change a document name. Then, when the operator touches a corresponding key, a picture showing the more specific function appears on the touch panel 31. In this manner, the touch panel 31 uses a dot display and can optimally display graphic information.

Figure 3:
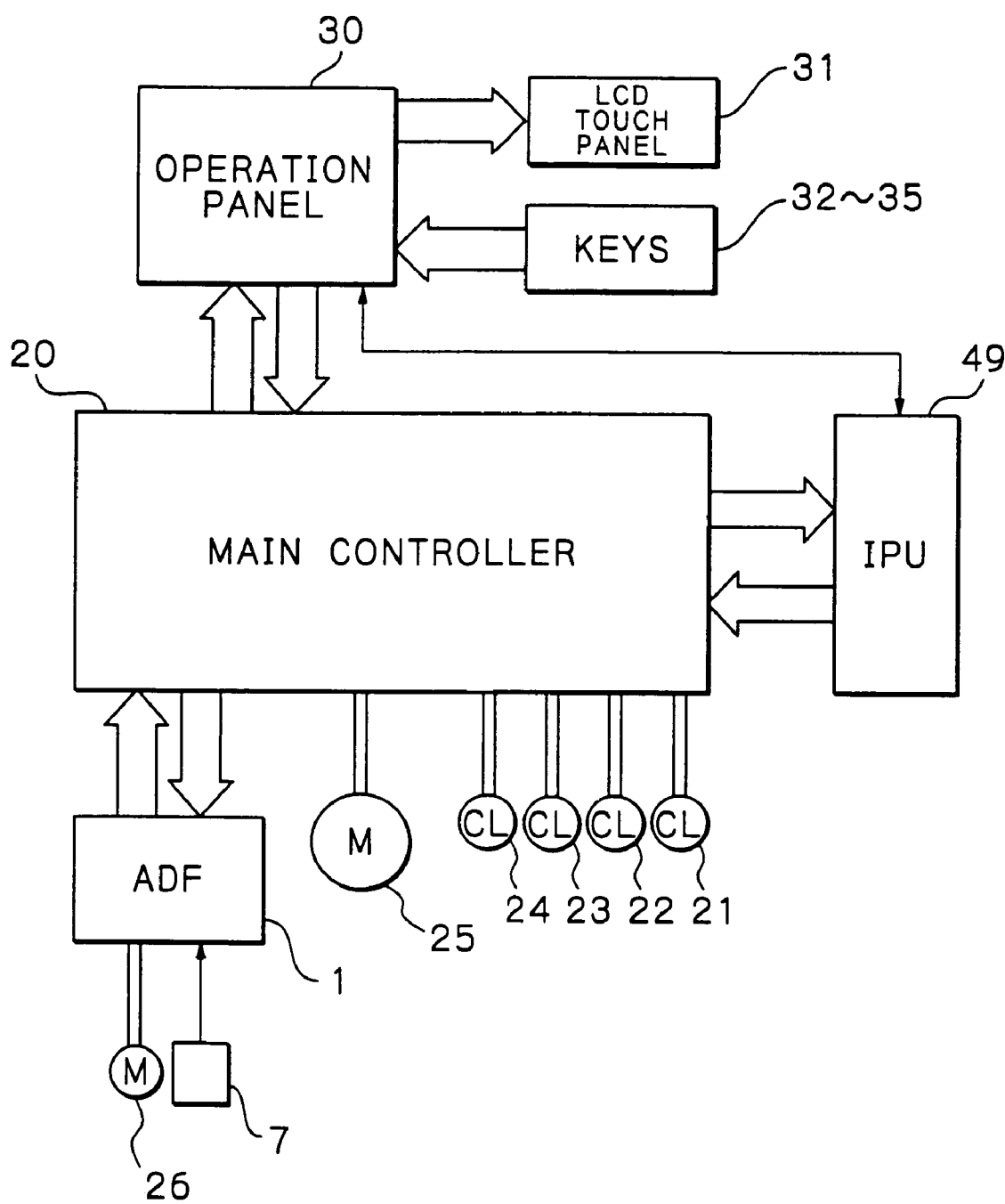
FIG. 3 is a block diagram schematically showing a control system included in the illustrative embodiment.

FIG. 3 shows a control system including a main controller 20. The main controller 20 controls the entire copier. The operation panel 30, including the touch panel 31 and keys 32 through 35, is connected to the main controller 70. Also connected to the main controller 20 are an image processing unit (IPU) 49 and the ADF 1 to be discretely controlled. The ADF 1 includes the conveyance motor 26 and document sensor 7. The IPU 49 controls a scanner, controls the writing of document image data in the video memory, and controls image formation to be executed with the image data stored in the video memory. Further connected to the main controller 70 are the main motor 25 and clutches (CL) 21 through 24, which are respectively associated with the vertical conveying unit 14 and first to third paper feeders 11 through 13.

Referring again to FIG. 1, the document reading step to the image writing step will be described more specifically. These steps are mainly assigned to the reading unit 50 and writing unit 57.

The reading unit 50 includes scanning optics in addition to the glass platen 6. The scanning optics includes lamps 51, a first mirror 52, a lens 53, and a CCD (Charge Coupled Device) image sensor 54. The lamps 51 and first mirror 52 are mounted on a first carriage not shown while the second mirror 55 and third mirror 56 are mounted on a second carriage not shown. A scanner drive motor, not shown, causes the first and second carriages to move at a relative speed of 2:1, so that the optical path has a constant length.

The CCD image sensor 54 reads the image of a document and outputs a corresponding electric signal.

The writing unit 27 includes a lens 59 and a mirror 60 in addition to the laser unit 58. The laser unit 58 accommodates a laser diode and a polygonal mirror. A motor, not shown, causes the polygonal mirror to rotate at a high, constant speed. The writing unit 27 emits a laser beam so as to scan the surface of the drum 15 in the main scanning direction. A beam sensor, not shown, adjoins one end of the drum 15 and outputs a main scan synchronizing signal by sensing the laser beam. A write start timing in the main scanning direction and control signal for the input and output of image signals, which will be described later, are generated on the basis of the main scan synchronizing signal.

How an image signal output from the reading unit 50 is transformed to image data to be input to the writing unit 57 will be described hereinafter. This procedure is mainly assigned to the IPU 49.

Figure 4:
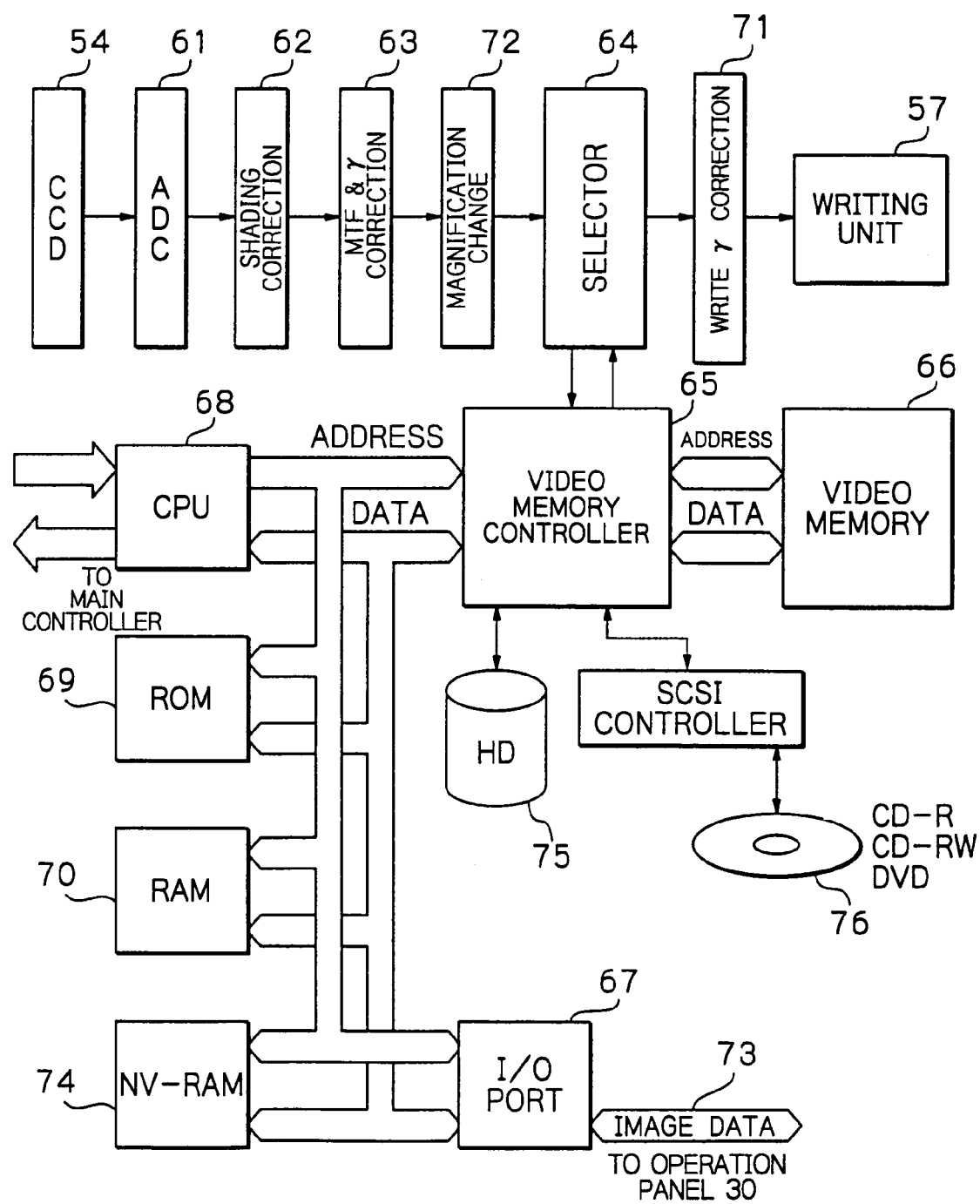
FIG. 4 is a schematic block diagram showing a specific configuration of an image processing unit included in the control system of FIG. 3.

FIG. 4 shows a specific configuration of the IPU 49. As shown, the IPU 40 includes the CCD image sensor 54 for transforming a reflection from a document illuminated by the lamps 51 to an electric signal. An ADC (Analog-to-Digital Converter) 61 converts the electric signal to a digital signal or image data. A shading correction 62 executes shading correction with the image data. An MTF (Modulation Transfer Function) and γ correction 63 executes MTF and γ correction with the image data output from the shading correction 62. A magnification change 72 executes enlargement or reduction with the image data output from the correction 63 in accordance with a magnification change ratio selected. A selector 64 selectively delivers the image data output from the magnification change 72 to a write γ correcting unit 79 or a video memory controller 65. The write γ correcting unit 71 corrects the write γ of the image data in accordance with image forming conditions and feeds the corrected image data to the writing unit 57.

The video memory controller 65 and selector 64 are capable of interchanging image data with each other. The IPU 49 additionally includes a CPU (Central Processing Unit) 68, a ROM (Read Only Memory) 69, a RAM (Random Access Memory) 70, and an NV-RAM (Non-Volatile RAM) 74. The CPU 68 controls the setting of the video memory controller 65 and controls the reading unit 50 and writing unit 57. The ROM 69, RAM 70 and NV-RAM 74 store a program meant for the CPU 68 and data. The CPU 68 is capable of writing and reading data out of a video memory 66 via the video memory controller 65. Specifically, image data representative of documents are written to or read out of the video memory 66, a hard disk (HD) 75 or an external storage 76. The image data are transferred between the video memory 66 and the HD 75 or the external storage 76 or output to the writing unit 57.

More specifically, in the illustrative embodiment, the video memory controller 65 includes a section for compressing the image data input via the selector 64. The compressed image data are written to the video memory 66. Image data with 256 tonality levels, which corresponds to the largest image size, may be directly written to the video memory 66 without compression, if desired. The illustrative embodiment compresses the image data in order to effectively use the limited capacity of the video memory 66. Further, the compression allows mass image data to be stored in the video memory 66 at a time, so that in a sort mode the image data can be read out of the video memory 66 in order of page. An expanding section also included in the video memory controller 65 sequentially expands the image data read out of the video memory 66. The above function is generally referred to as an electronic sorting function.

Furthermore, image data representative of a plurality of documents may be sequentially written to the divided portions of the area of the video memory 66 corresponding to a single paper sheet. For example, image data representative of four documents may be sequentially written to the quadrisect areas of the video memory 66 corresponding to a single paper sheet. In such a case, the four documents will be combined and printed on a single paper sheet.

The CPU 68 is capable of accessing the image data stored in the video memory 66. This allows the image data stored in the video memory 66 to be reduced, cut out or otherwise processed. This can be done by writing control data in a register included in the video memory controller 66. The processed image data are again written to the video memory 66.

The video memory 66 is divided into a plurality of areas in accordance with the size of image data to be processed, so that the input and output of image data can be executed at the same time. For this purpose, the video memory 66 is interfaced to the video memory controller 65 by two sets of address and data lines, one for reading and the other for writing. This configuration allows image data to be written to, e.g., an area 1 and allows image data to be read out of an area 2 at the same time.

Further, the CPU 68 is capable of transferring the image data read out of the video memory 66 to the operation panel 30 via an I/O (Input/Output) port 67 as image data 73. Because display resolution available with the operation panel 30 is generally low, the image data read out of the video memory 66 are reduced, or thinned out, and then sent to the operation panel 30.

The HD 75 may be used in addition to the video memory 66 because the video memory 66 stores mass image data. The HD disk 75 permanently stores image data even when a power switch provided on the apparatus is turned off. It is a common practice to use the HD 75 when a plurality of regular or formatted documents are read by a scanner and stored. The external storage 76 includes a removable storing medium, e.g., CD-R, CD-RW or DVD (Digital Versatile Disk). An SCSI (small Computer System Interface) controller controls the bus of the external storage 76 in the event of write-in or read-out of image data. At this instant, the image data are once written to the video memory 66 in order to absorb differences between the above writing or reading operation and the image formation and read-out from the scanner. More specifically, image data output from the scanner are written to the external storage 76 by way of the video memory 66 without exception. Also, image data read out of the external storage 76 are sent to the writing unit 57 by way of the video memory 27 without exception.

As stated above, the video memory controller 65 determines a video path when image data are written to or read out of the video memory 66, HD 75 or external storage 76, when image data output from a scanner are input, or when the image data to be sent to the writing unit 57 are output. The CPU 68 determines the destination of image data to be input or output, allowing the video memory controller 66 to switch the flow of image data.

Figure 5:
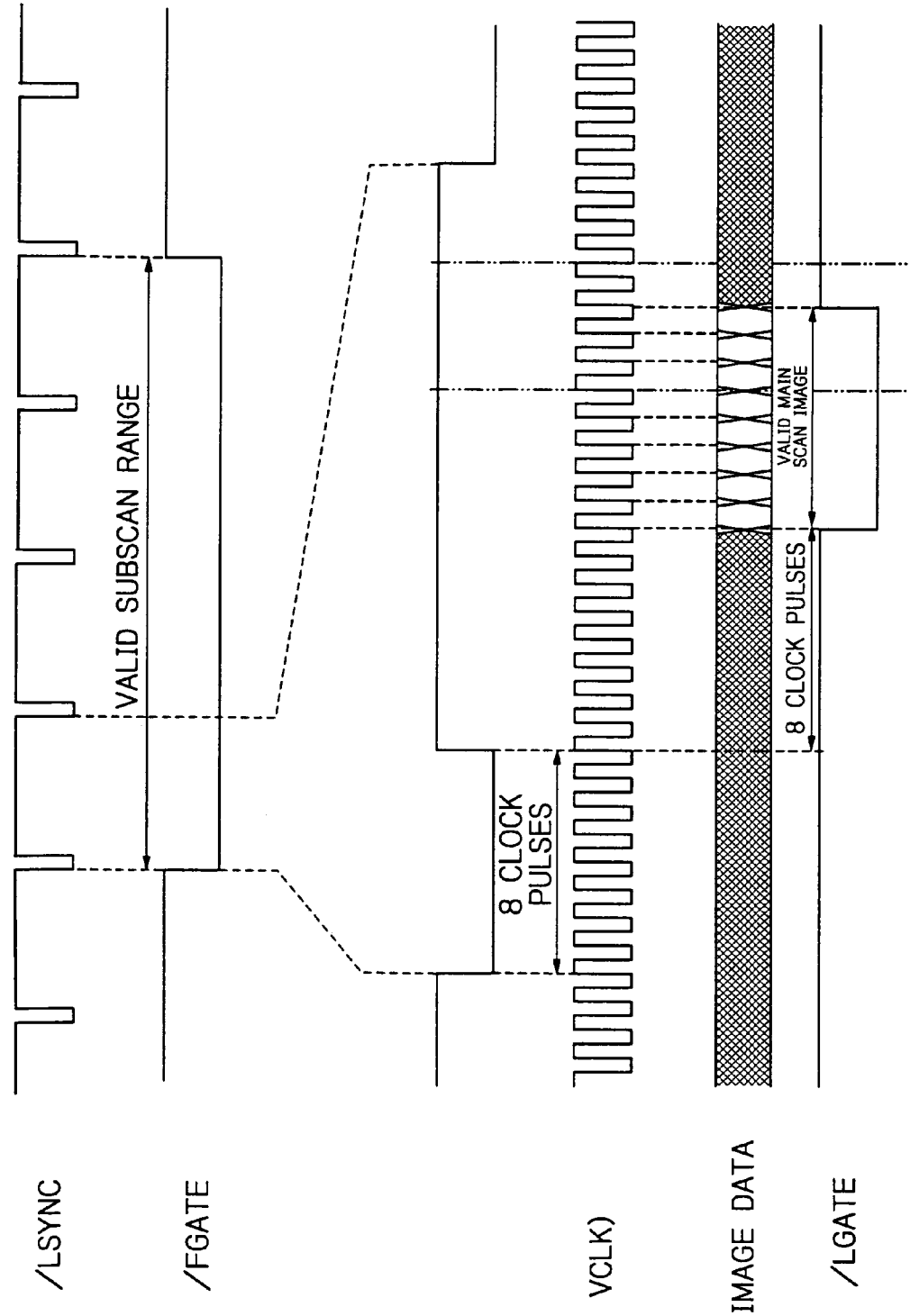
FIG. 5 is a timing chart showing signals to be dealt with by a selector included in the configuration of FIG. 4.

FIG. 5 shows a specific transfer timing of one page of image data via the selector 64. In FIG. 5, /FGATE is representative of a valid period of one page of image data in the subscanning direction. /LSYNC is representative of a line-by-line main scan synchronizing signal; the image data is validated by a preselected clock after the positive-going edge of the signal /LSYNC. A signal /LGATE indicates that the image data in the main scanning direction is valid. These signals are synchronous to a pixel clock VCLK. A single pixel, eight bits (256 tonality levels) of data is input to the selector 64 for a single period of the pixel clock VCLK. In the illustrative embodiment, image data are printed on a paper sheet at a density of 400 dpi (dots per inch) while the maximum number of pixels is 4,800 in the main scanning direction and 6,800 in the subscanning direction. Also, image data are assumed to approach a white image as they approach 255.

A specific procedure for copying the image data stored in the video memory 66 or the HD 75 in the external storage 76 will be described hereinafter. A copy application is conventional and will be note described specifically.

Figure 6:
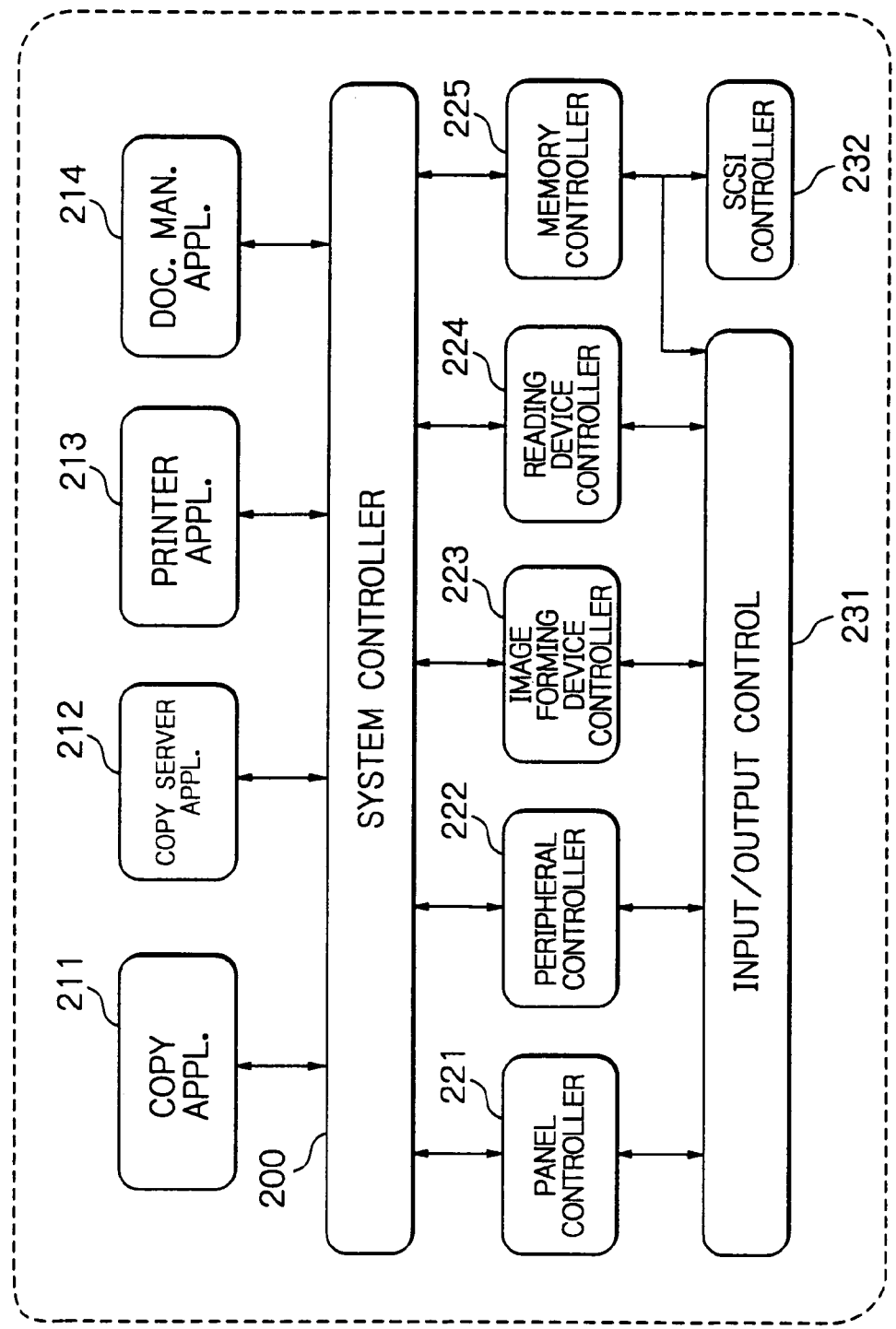
FIG. 6 is a schematic block diagram showing a software system included in the illustrative embodiment.

FIG. 6 shows a software system included in the illustrative embodiment. As shown, the system includes a document management application (DOC. MAN. APPL.) 214 representative of a function of dealing with existing stored image data. This application 214 operates independently of a copy application (COPY APPL.) 211, a copy server application (COPY SERVER APPL.), and a printer application (PRINTER APPL.). A system controller 200 arbitrates controllers 221 through 225 assigned to the operation panel, which is a shared resource, peripherals, ah image forming device, an image reading device and a memory unit.

While the above applications each draw a particular picture, the picture is not displayed on the operation panel, but is virtually generated within the memory. Specifically, because a single application actually appears on the operation panel, the panel controller 221 selects one of virtual pictures generated by the various applications under the control of the system controller 200 and arranges it in a. picture as a panel owner application. When the external storage 76 is mounted to the dopier, it is connected to the connection port of an SCSI controller 232 shown in FIG. 6 and controlled by the SCSI controller 232.

In the illustrative embodiment, the document management application 214 causes an image stored in the video memory 66 or the HD 75 to be copied in the external storage 76, as will be described hereinafter.

Figure 7:
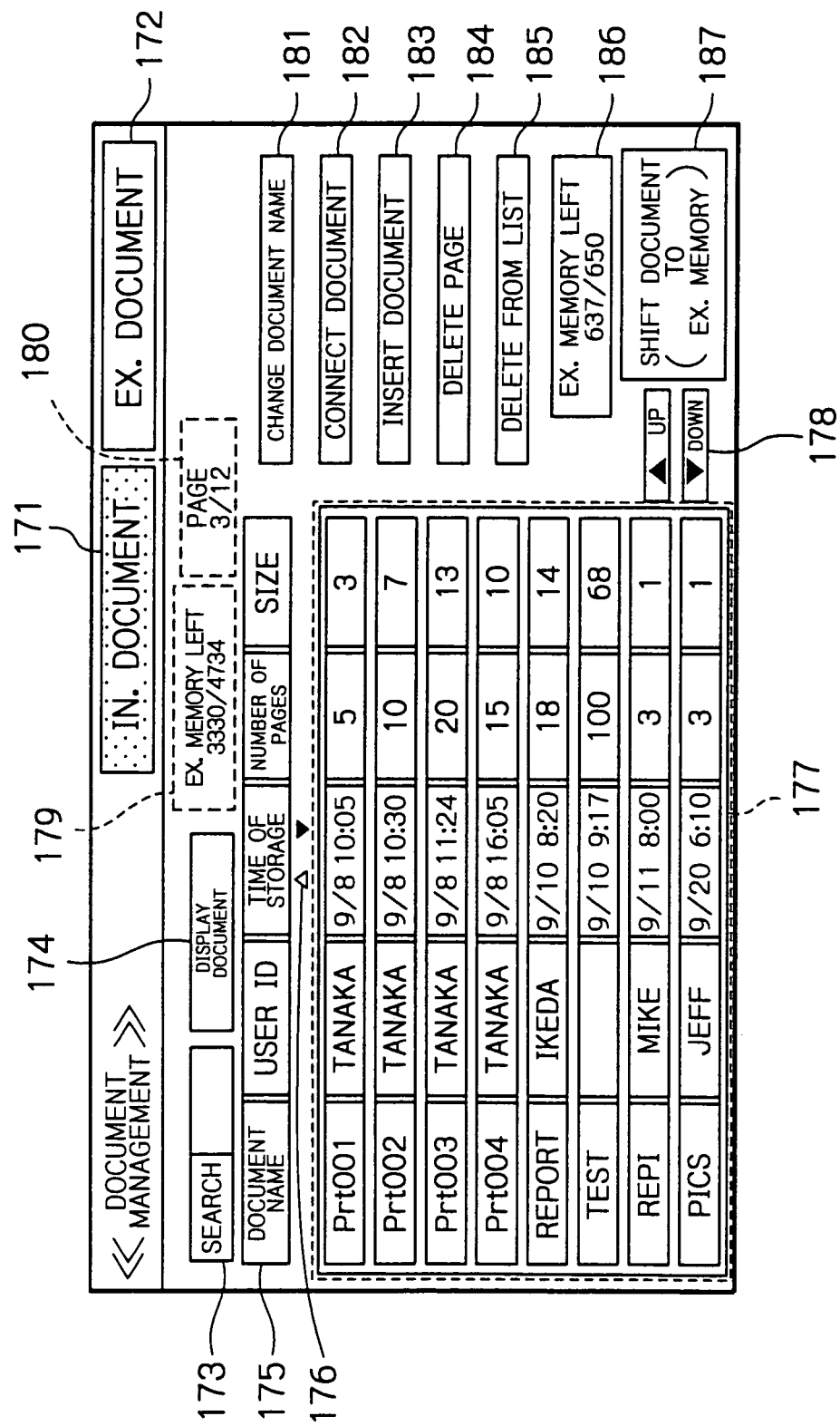
FIG. 7 is a view showing a specific picture available for operating a document management application included in the system of FIG. 6.

FIG. 7 shows a specific picture for causing the document management application 214 to operate. The picture of FIG. 7 appears on the touch panel 31 when the operator touches the document key 40, FIG. 2. In the illustrative embodiment, various functions relating to image data stored in internal storing means and image data stored in the external storage 76 are available. The internal storing means refers to the video memory 66 or the HD 75 built in the copier and is identical in meaning with an internal memory. In FIG. 7, an internal document key 171 is reversed to show that image data stored in the internal storing means can be edited.

When the operator touches an external document key 172, a picture shown in FIG. 8 appears on the touch panel 31, showing the operator that image data stored in the external storage 76 can be edited.

The picture shown in FIG. 7 includes an area 177 assigned to various image attribute information for specifying the image data stored in the internal storage, i.e., user IDs (identifications), document names, numbers of pages, times of storage, and data sizes (amounts of data). A user ID is assigned by a printer driver included in a personal computer, which is connected to the copier, and therefore displayed only at the time of storage using the printer function. A document name is attached every time an image is stored. A number of pages is representative of the number of document images stored. A time of storage is representative of the time of storage of image data. Such image management information are stored in the NV-RAM 74 and therefore preserved even when a power switch, not shown, is turned off. While only eight different image attribute information are shown in the area 177, the operator may touch an up key 178 or a down key 178 in order to see other attribute data being not displayed.

In FIG. 7, an area 180 shows a page that indicates the position of eight image attribute information appearing in the picture in a list, which lists all image attribute information. The area 180 is shown as indicating that the above list contains twelve pages of image attribute information, and that eight image attribution information being displayed are listed in the third page.

When the operator touches desired one of items shown in an area 175, the image attribute information list is sorted on the basis of the item selected. In FIG. 7, the list is sorted in accordance with the time of storage by way of example A list searching function is available when a search key 173 is pressed.

Figure 9:
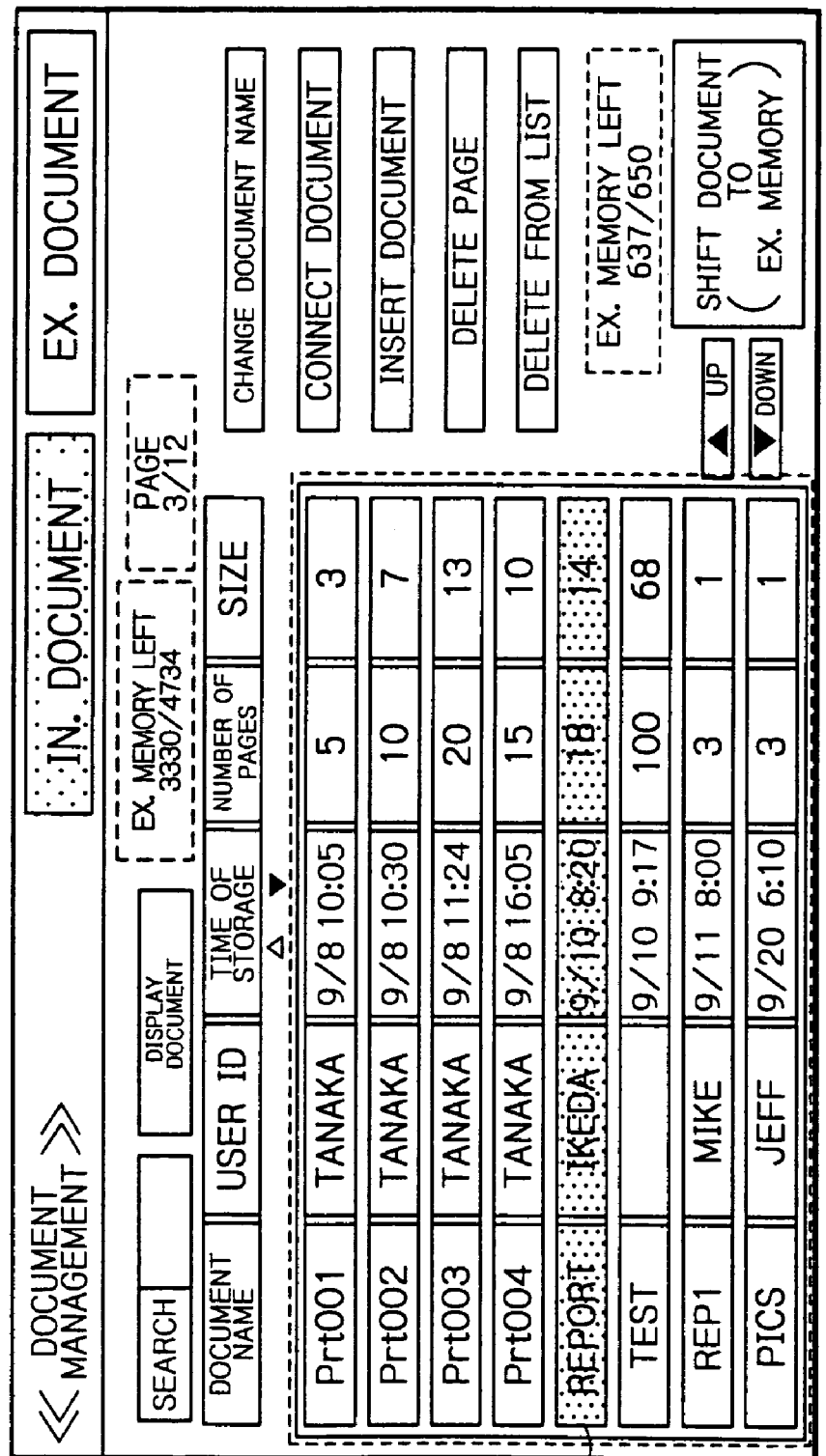
FIG. 9 is a view showing a specific picture for selecting files or internal stored documents.

When the operator touches desired one of the image attribute information in the display area 177, the attribute information selected is reversed, as shown in an area 195 of FIG. 9. Let this reversed condition be referred to as a designated condition. The operator can designate a plurality of different image attribute information. When the operator touches a "display designated document" key 174, only the image attribute information in the designated state appear in the display area 177. A display area 179 shows the total capacity and residual capacity (megabytes) of the internal storing means. A display area 186 shows the total capacity and residual memory capacity (megabytes) of the external storage 76.

The picture shown in FIG. 7 further includes a "change document name" key 181, a "connect documents" key 182, an "insert document" key 183, a "delete page" key 184, a "strike off" key 185, and so forth.

Figure 10:
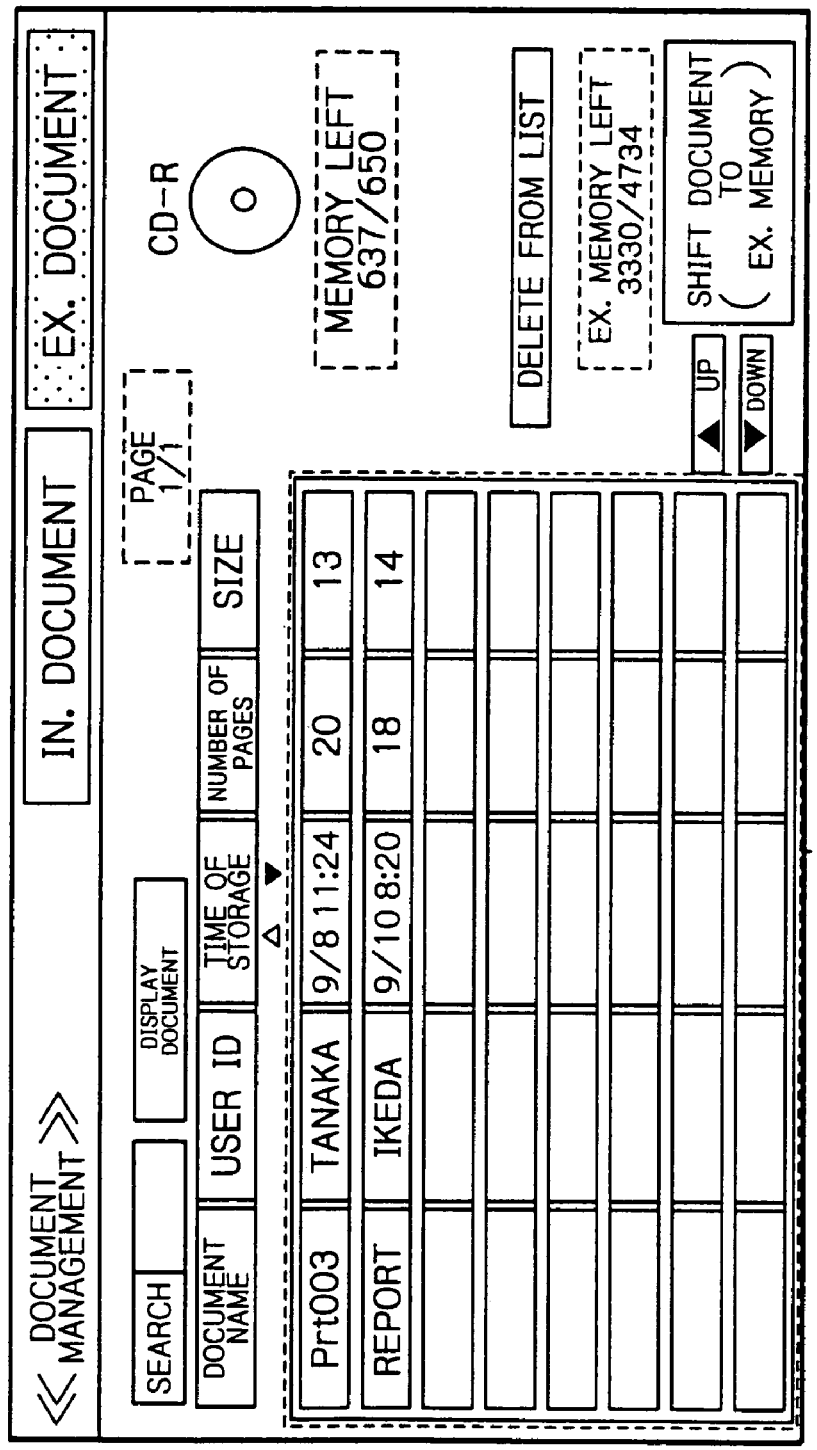
FIG. 10 is a view showing a specific picture for manipulating external stored documents.

When the operator touches desired image attribute information and then a "shift document" key 187, the image data and image attribute information are written to the external storage 76. At this instant, an image attribute information list stored in the external storage 76 is updated and again written to the storage 76. When the operator touches an external document key 172, a specific picture shown in FIG. 10 appears on the touch panel 31. In the picture of FIG. 10, the image attribute information list appears in an area 198.

The transfer of files between the internal storing means and the external storage 76 will be described hereinafter. In the illustrative embodiment, the operator may selectively transfer files from the internal storing means to the external storage 76 on the basis of the "internal document" image of FIG. 7 or from the external storage 76 to the internal storing means on the basis of the "external document" image of FIG. 8.

Briefly, the illustrative embodiment selects optimal check processing for each of two different cases. In one case, image files are written to the external storage 76 loaded with a removable storing medium (particularly a write limiting type of storing medium) In the other case, image files are written to the internal storing medium, i.e., the video memory 66 or the HD 75 capable of storing, even during transfer from the external storage 76, image data output from the scanner or input from the outside of the copier. The limit check processing determines whether or not image files can be transferred. Transfer is executed or interrupted on the basis of the result of the limit check processing.

Figure 11:
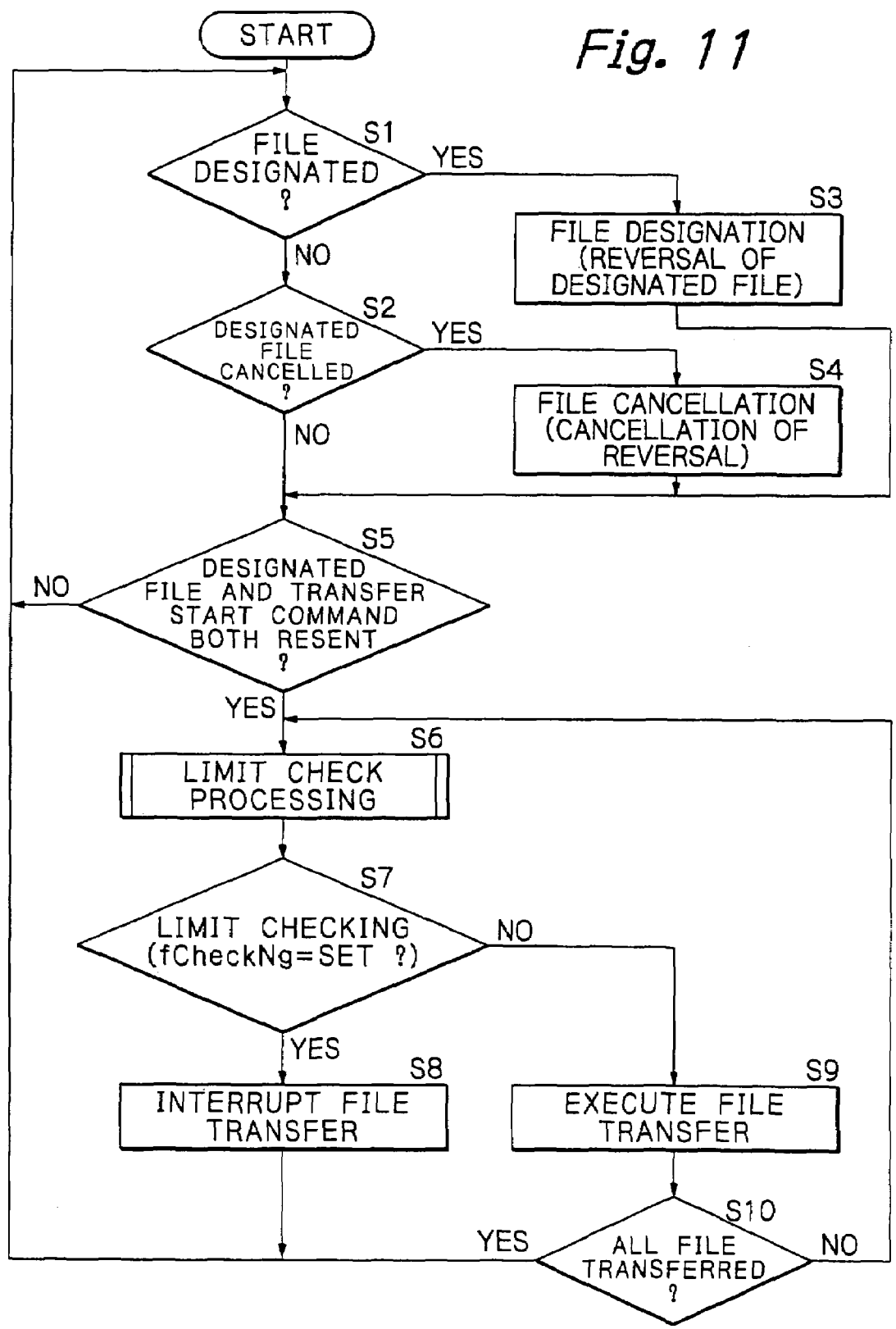
FIG. 11 is a flowchart outlining a file transfer procedure.

FIG. 11 shows a file transfer procedure shared by both of the transfer from the internal storing means to the external storage 76 and the transfer from the latter to the former. However, as for a limit check processing (step S6) included in the procedure, a particular operation mode is assigned to each of the two different directions of transfer. As shown, when the operator touches the file area of the picture of FIG. 7, whether or not the operator has designated a file or canceled the designation is determined (steps S1 and S2).

In the case of transfer from the external storage 76 to the internal storing means, the following sequence of steps are executed on the basis of the picture of FIG. 8. If the answer of the step S1 is positive (YES), the designated file is reversed (step S3), as shown in FIG. 9 specifically. If the answer of the step S2 is YES, file designation is cancelled (step S) i.e., the file reversed in FIG. 9 is restored to the original condition shown in FIG. 7.

After the step S3, whether or not the operator has touched the "shift document" key 187 in the picture of FIG. 7 is determined (step S5). If the answer of the step SS is NO, the procedure returns to the step 31. If the answer of the step S5 is YES, i.e., if a designated file is present and if a transfer start command is input on the key 187, the limit check processing is executed (step S6). The step S6 will be described in detail later with reference to FIGS. 12, 13, 15, 16 and 19. As a result of the step S6, an NG (No Good) flag (fCheckNg)is set or reset (step S7). If the NG flag is set, meaning "no good", the file transfer is interrupted (step S8), and the operation returns to the step S1. If the NG flag is reset, i.e., if the result of the check is good, file transfer is executed (step S9). Subsequently, whether or not all files have been transferred is determined (step S10). If the answer of the step S10 is negative (NO), the step S6 and successive steps are executed. If the answer of the step S10 is YES, the operation returns to the step S1.

The limit check processing (step S6) is executed before file transfer, i.e., when the operator touches the "shift document" key and at the time of file transfer, i.e., before the transfer of the individual file. The check before the start of file transfer obviates wasteful transfer. Particularly, when a CD-R, CD-RW or similar write limiting type of storing medium is used as a storage (external storage 76), the writing condition is limited. Specifically, a CD-R does not allow data to be written to its region used once while a CD-RW does not allow data to be written more than a guaranteed number of times. Therefore, when a factor that causes transfer to be interrupted exists, the check before the start of file transfer not only obviates wasteful operation, but also enhances the efficient use of the storing medium.

Further, in the case of transfer to the external storage 76 loaded with a CD-R or a CD-RW, the result of the initial check does not vary throughout the transfer because a CD-R or a CD-RW does not allow any data to be written or readout during writing. This is also true with storing means of the type accessible only under control conditions that prevent a plurality of write accesses to occur at the same time. In such a case, only the check before the start of file transfer suffices, i.e., the step S10 (NO) may be followed by the step S9 in order to omit the check during file transfer.

It is likely that store processing is executed during the repeated file transfer due to, e.g., the image reading of the scanner or the new file storage from the printer. In the illustrative embodiment, the above store processing delivers image data to the video memory 66 or the HD 75. The check effected during the repeated file transfer. copes with such store processing. For example, the check relating to the limit of capacity is surely effected every time a file is transferred, obviating a trouble ascribable to the factor described above.

Another specific file transfer procedure available with the illustrative embodiment is as follows. In FIG. 11, if the answer of the step S10 is YES, the operation returns to the step S1. In the alternative procedure, the operation returns to the step S1 by way of processing for displaying a list of files, which have been canceled. after designation. Specifically, assume that the result of the limit check (step S6) shows that files can be transferred if the number of designated files is reduced. Then, processing for reducing the number of designated files in order to effect file transfer is executed in the step S6, as will be described specifically later with reference to FIG. 24. This processing is added because the operator may transfer the canceled files by using another media.

Figure 24:
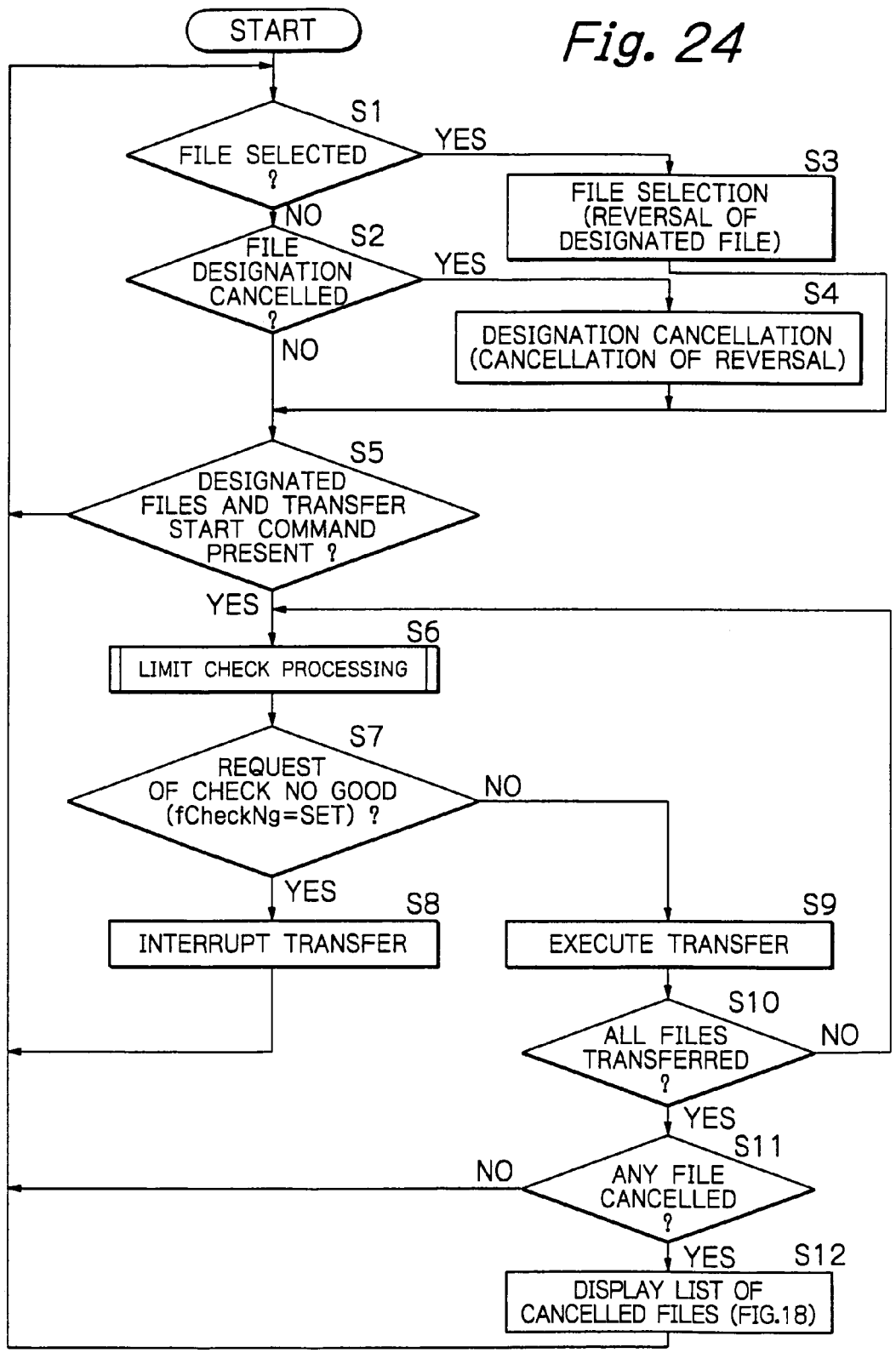
FIG. 24 is a flowchart outlining another specific file transfer procedure.

More specifically, as shown in FIG. 24, if the answer of the step S10, FIG. 11, is YES, whether or not files canceled and not transferred as a result of the step S6 exist is determined (step S21). If the answer of the step S11 is YES, a list listing the above files is displayed (step S12). FIG. 18 shows a specific picture showing such a list. The operator, watching the picture of FIG. 18, can continue the file transfer without again selecting the files. As for the steps S1 through S10, the procedure of FIG. 24 is identical with the procedure of FIG. 11.

The limit check processing (S6) shown in FIG. 11 or 24 will be described in detail hereinafter. The limit check processing checks either one of the residual memory capacity of the destination and the number of residual files that can be additionally stored in the destination.

Figure 12:
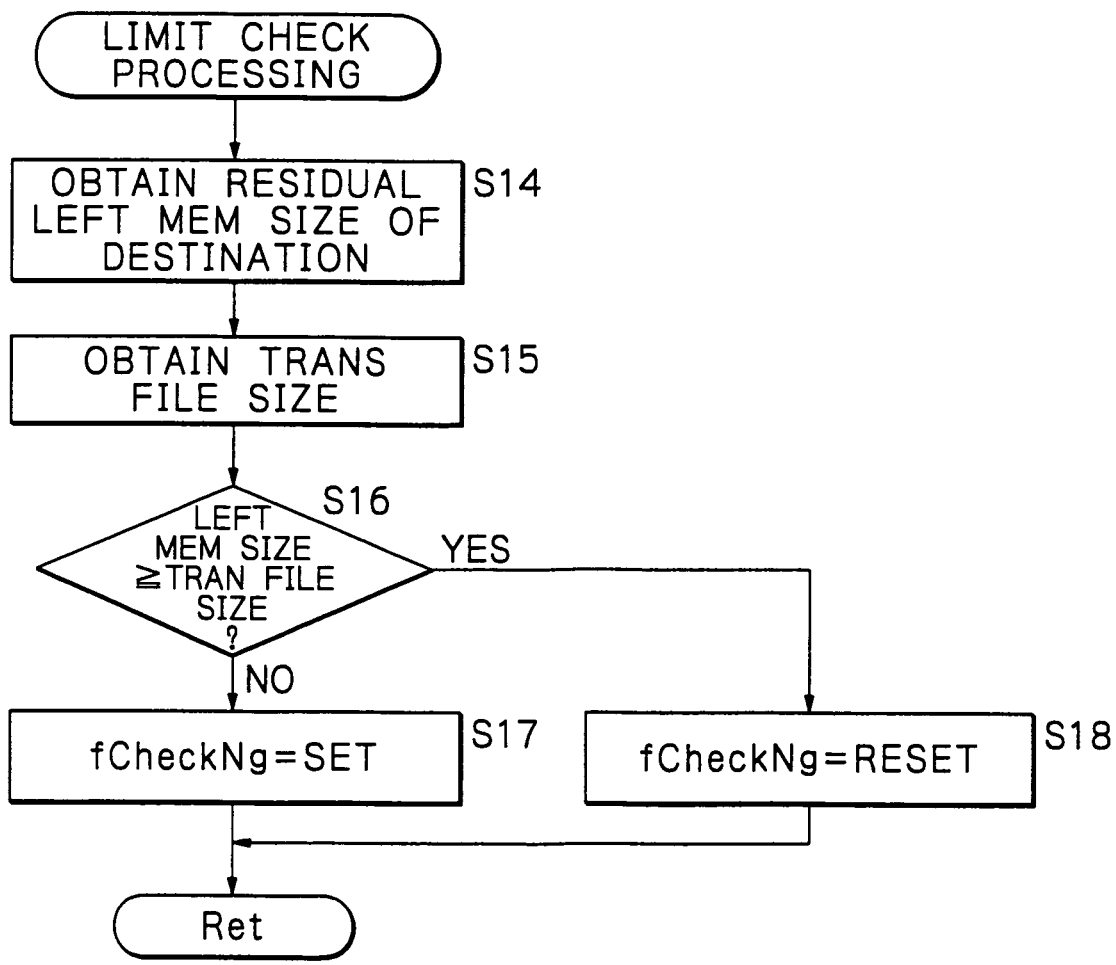
FIG. 12 is a flowchart demonstrating specific limit check processing included in the procedure of FIG. 11 and based on the residual memory capacity of a destination.
Figure 14A:
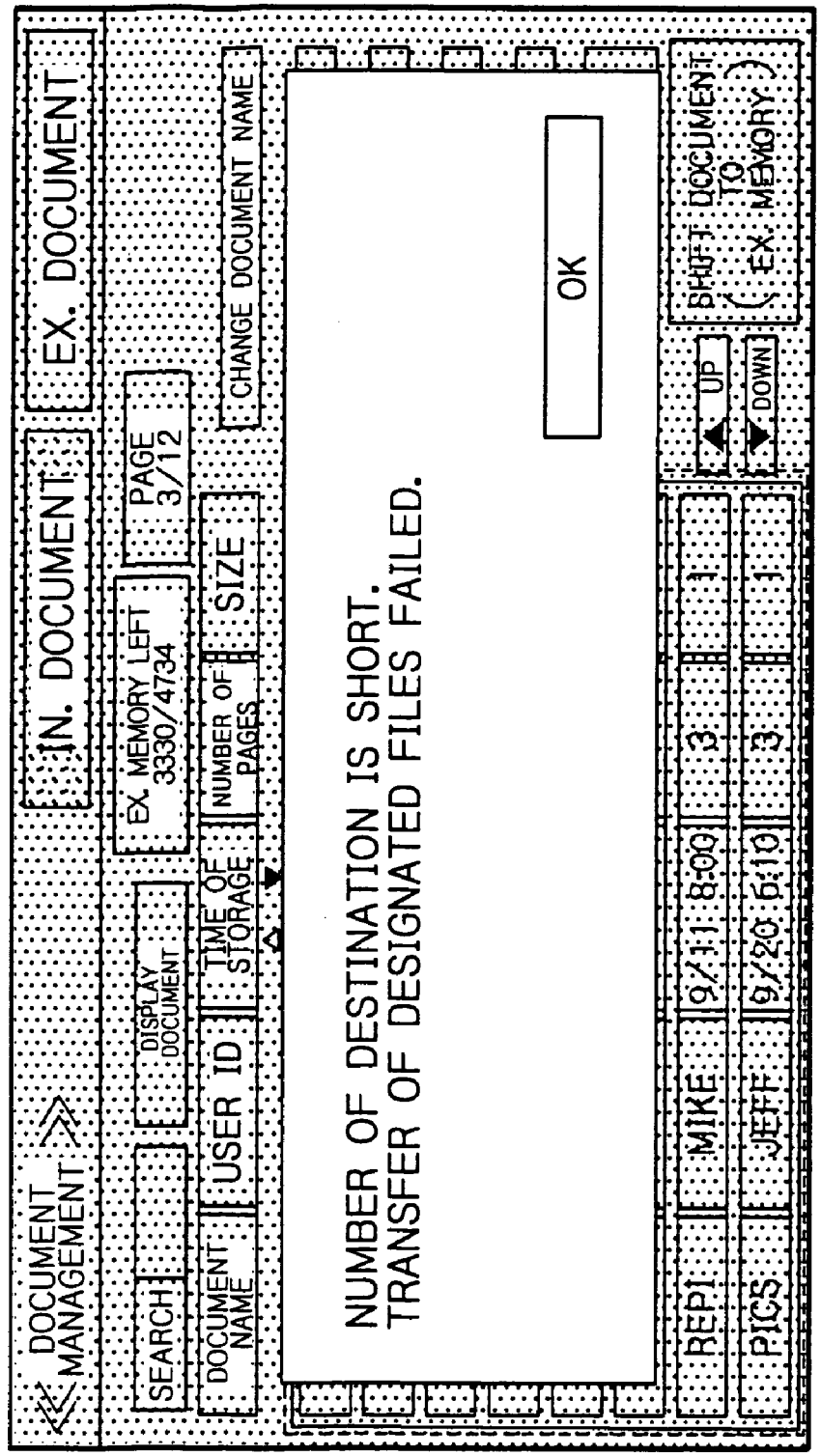
FIGS. 14A and 14B are views each showing a particular specific picture including a message that shows the interruption of file transfer.

FIG. 12 shows the limit check processing based on the residual capacity of the destination. As shown, the residual capacity of the destination (LEFT MEM SIZE) is determined (step S14), and then the total capacity of files to be transferred (TRANS FILE SIZE) is determined (step S15). Subsequently, whether or not the residual capacity of the destination is greater than or equal to the total capacity of files to be transferred is determined (step S16). If the answer of the step S16 is NO, meaning that the residual capacity of the destination is short, the check NG flag is set (step S17) with the result that the transfer is interrupted in the steps S11 and S8 of FIG. 11 or 24. At this instant, as shown in FIG. 14A, a message informing the operator of the transfer failure appears in the picture being displayed.

By determining the residual capacity of the destination, it is possible to avoid wasteful file transfer. As for a CD-R, for example, wasteful writing that obstructs the efficient use the memory capacity does not occur.

If the answer of the step S16 is YES, meaning that the residual capacity of the destination is great enough to accommodate all the files, the check NG flag is reset (step S18). As a result, file transfer is executed in the step S9 of FIG. 11 or 24.

As for the transfer from the external storage to the internal storing medium, the residual capacity of the destination and the total capacity of files to be transferred are determined even during transfer. Specifically, another application being executed in parallel is apt to use the internal storing means in order to store, e.g., an image printed by the printer or read by the scanner. In such a case, even if the residual capacity of the destination has some room for the total capacity of files, as determined before the transfer, the residual capacity decreases by (capacity occupied by transferred files+capacity used by another application) each time. It is therefore likely that the file transfer is disabled halfway.

Figure 13:
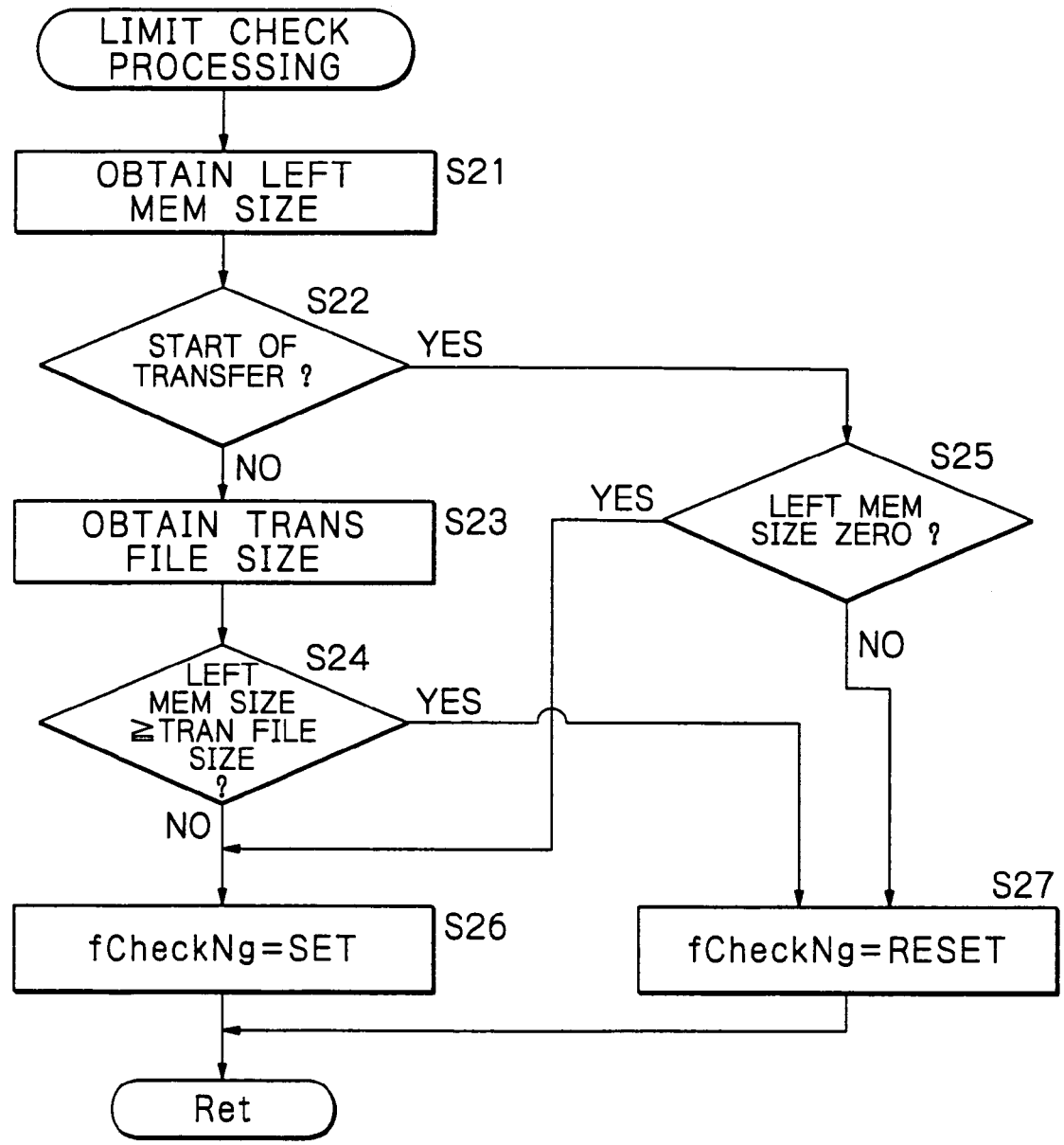
FIG. 13 is a flowchart showing another specific limit check processing based on the residual memory capacity of a destination.

FIG. 13 shows another specific limit check processing based on the residual memory capacity of the destination. As shown, the residual capacity of the destination is determined (step S21). Subsequently, whether or not transfer has started (step S42). If the answer of the step S42 is NO, the total capacity of files to be transferred is determined (step S23). If the residual capacity of the destination is not greater than or equal to the total capacity of files (NO, step S24), the check NG flag is set (step S26). As a result, file transfer is interrupted in the steps S7 and S8 of FIG. 11 or 24. Again, the specific message shown in FIG. 14a is displayed to inform the operator of the transfer failure.

If the residual capacity of the destination is greater than or equal to the total capacity of files (YES, step S24), the check NG flag is reset (step S27). Consequently, file transfer is executed in the step S9 of FIG. 11 or 24.

If the answer of the step S22 is YES and if the check is effected every time a file is transferred, whether or not a memory control section (video memory controller 65) is outputting a memory-full signal is determined (step S25). If the answer of the step S25 is YES, the check NG flag is set (step S27). This interrupts the file transfer in the steps S7 and S8 of FIG. 11 or 24.

Steps to be executed after the start of file transfer correspond to the steps described in relation to the file transfer from the external storage to the internal storing means. A memory-full state is apt to occur during file transfer because of the residual capacity of the destination that decreases little by little, as stated previously. The procedure shown in FIG. 13 detects the memory-full state with a simple method.

Figure 14B:
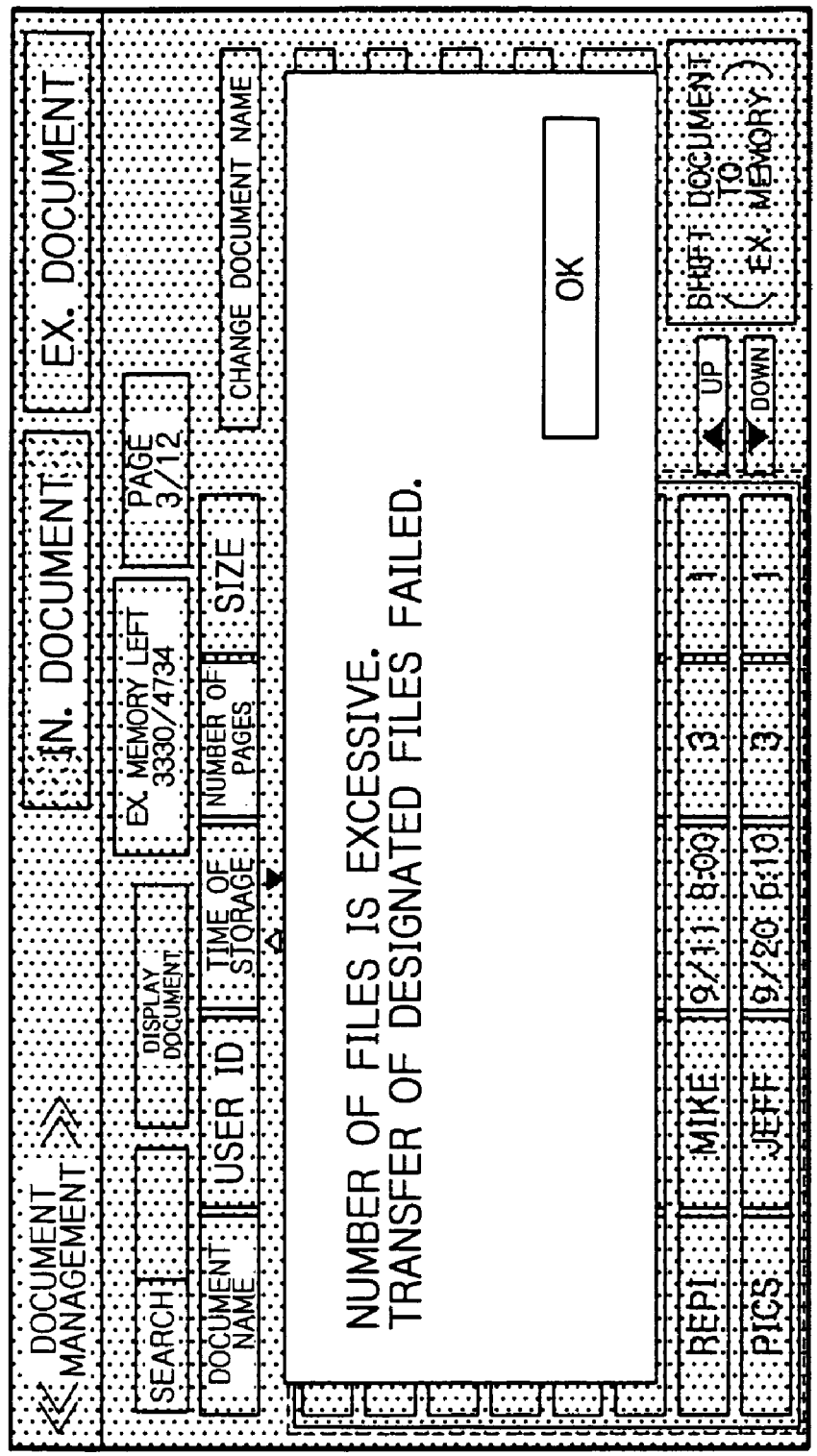
Figure 15:
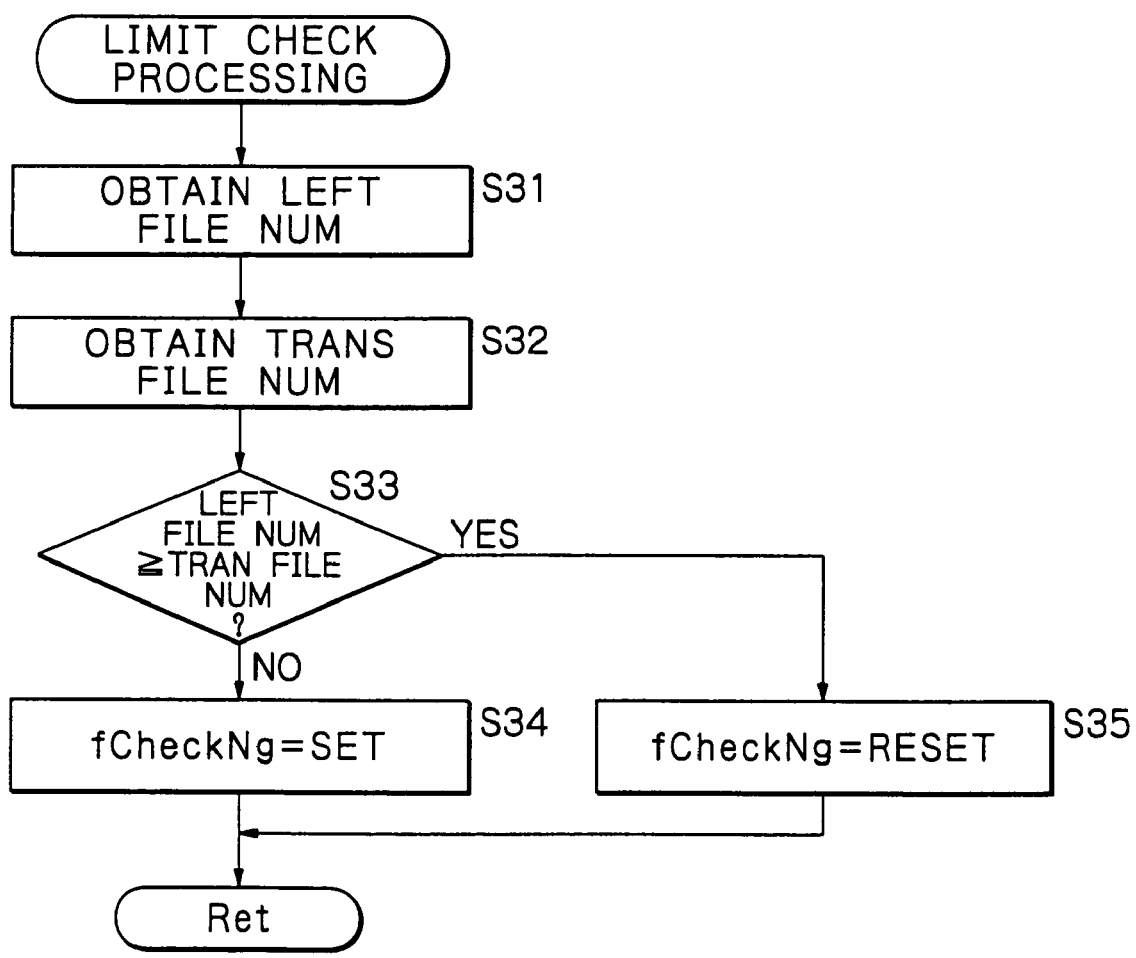
FIG. 15 is a flowchart showing specific limit check processing based on the number of residual files available at a destination.

FIG. 15 shows a specific limit check procedure using the number of residual files that can be additionally stored in the destination. As shown, how many files can be additionally written to the memory of the destination (Left File Num) is determined (step S31), and then the total number of files to be transferred (TRANS FILE NUM) is determined (step S32). Subsequently, whether or not the number of residual files available at the destination is greater than or equal to the total number of files to be transferred is determined (step S33). If the answer of the step S33 is NO, meaning that the number of residual files short, the check NG flag is set (step S34) with the result that file transfer is interrupted in the steps S7 and S8 of FIG. 11 or 24. At this instant, as shown in FIG. 14B specifically, a message informing the operator of the transfer failure appears in the picture being displayed.

By determining the number of residual files available at the destination, it is possible to avoid wasteful file transfer. As for a CD-R, for example, wasteful writing that obstructs the efficient use the memory capacity does not occur.

If the answer of the step S33 is YES, meaning that the number or residual files of the destination is great enough to accommodate all the files, the check NG flag is reset (step S35). As a result, file transfer is executed in the step S9 of FIG. 11 or 24.

As for the transfer from the external storage to the internal storing medium, the number of residual files available at the destination and the total number of files to be transferred are determined even during transfer. Specifically, another application being executed in parallel is apt to use the internal storing means in order to store, e.g., an image printed by the printer or read by the scanner. In such a case, even if the number of residual files of the destination has some room for the total number of files to be transferred, as determined before the transfer, the number of residual files decreases by (capacity occupied by transferred file+capacity used by another application) each time. It is therefore likely that the file transfer is disabled halfway.

In another specific limit check processing based on the number of residual files available at the destination, a particular sequence of steps are executed before and after the start of file transfer. Specifically, before the start of file transfer, the procedure described with reference to FIG. 15 is executed. On the other hand, after the start of file transfer, the step S25, FIG. 13, is executed to see if files can be transferred. More specifically, in the previously stated memory-full state, the check NG flag is reset.

Figure 16:
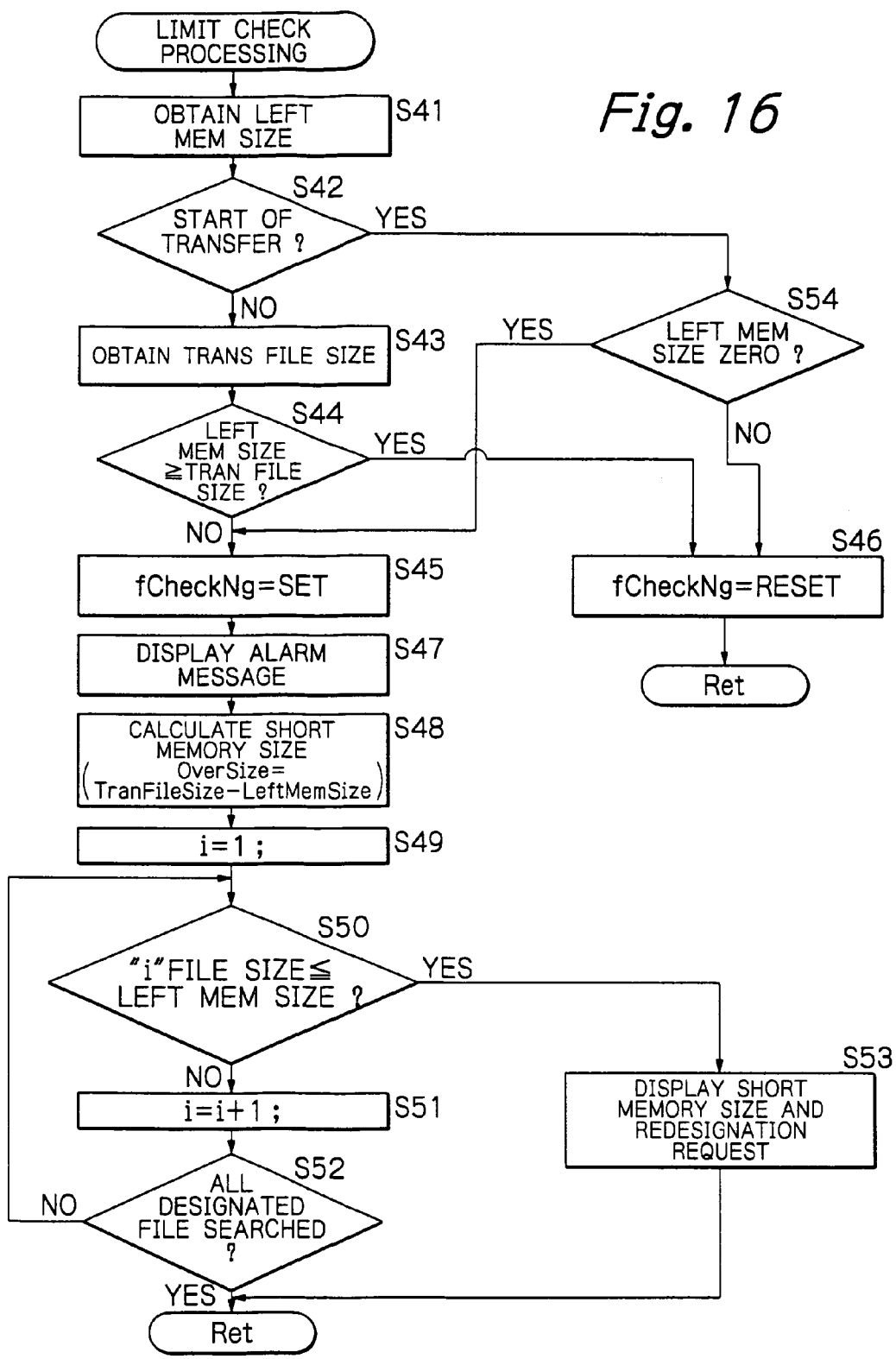
FIG. 16 is a flowchart showing another specific limit check processing based on the number of residual files available at a destination.

Hereinafter will be described a specific procedure relating to the limit check processing and improving the content of the alarm to be displayed when the residual memory capacity of the destination is determined to be short before the start of file transfer. File transfer absolutely fails if the residual capacity of the destination is short when a single file is to be transferred. On the other hand, there is a case wherein even when a plurality of files are designated by the operator, file transfer can be effected despite the short residual capacity of the destination if the number of files is reduced. The procedure to be described makes the above decision and urges the operator to alter the designated files. FIG. 16 shows such a procedure specifically. In FIG. 16, steps S41 through S46 and a step S54 are identical with the steps 521 through 524 and steps S26, S27 and S25 of FIG. 13 and will not be described specifically in order to avoid redundancy.

As shown in FIG. 16, after the check NG flag has been set due to the short residual capacity of the destination, an alarm message showing the operator that designated files cannot be transferred is displayed (step S47). An additional message appears in the same picture as the alarm message on the basis of the result of decision to be described hereinafter. First, a short memory size (OVERSIZE) is calculated by subtracting the residual capacity of the destination (LEFT MEM SIZE) from a file size to be transferred (TRANFILE SIZE) (step S48).

Figure 17:
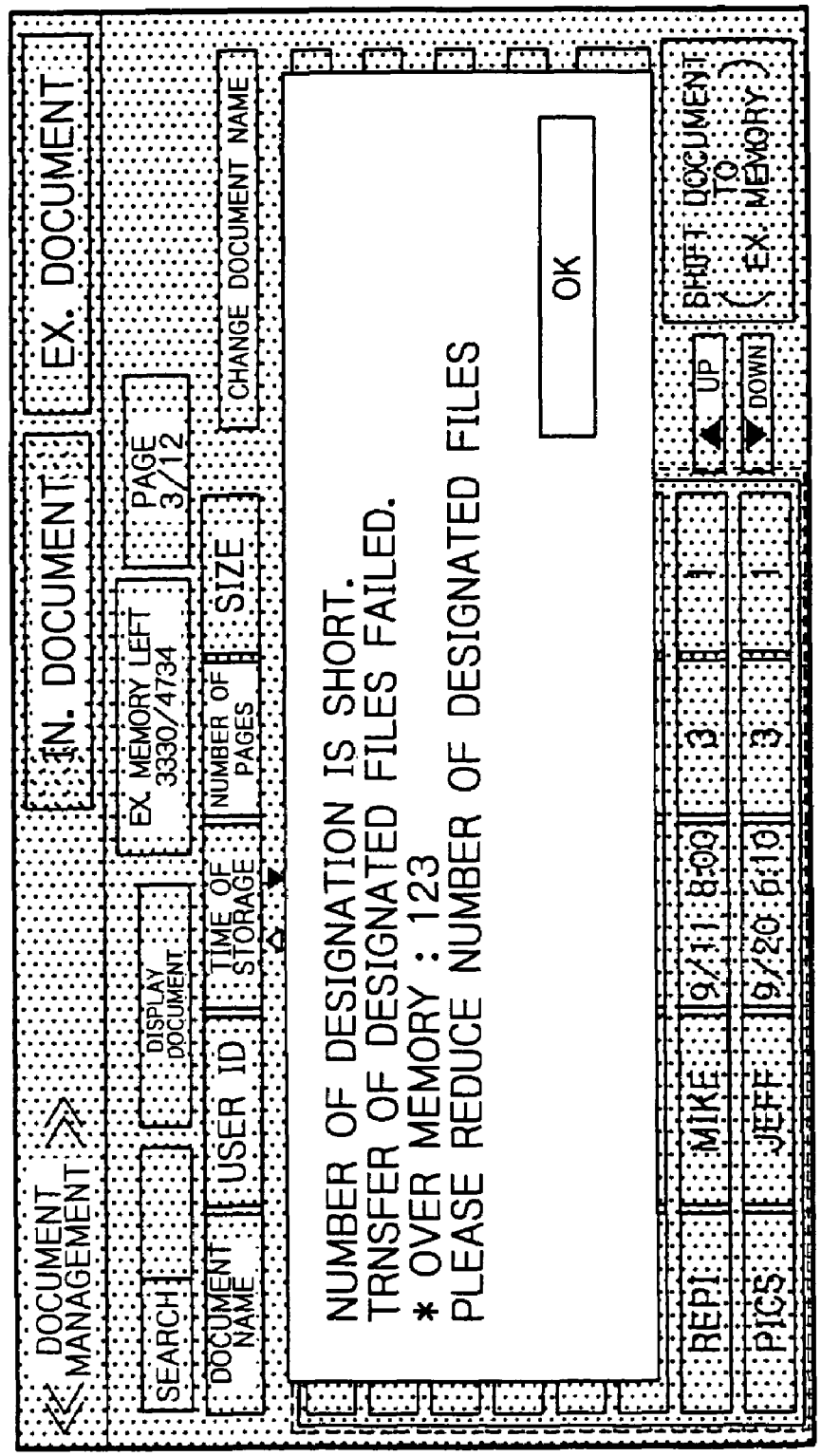
FIG. 17 is a view. showing a specific picture including a message showing the interruption of file transfer.

To determine a file size file by file, file numbers i beginning with 1 are attached to the designated files (step S49). Subsequently, whether or not the files #i have file sizes smaller than the residual memory capacity of the destination is determined one by one (step S50). If the answer of the step S50 is YES, meaning that file transfer can be effected if the number of files is reduced, an alarm message, e.g., one shown in FIG. 17 is displayed. The alarm message shows the short memory capacity (over memory number) calculated in the step S48 and the fact that file transfer is possible if the number of files is reduced.

If the answer of the step S50 is NO, the file number is incremented by 1 in order to set the next file number (step S51). Subsequently, whether or not all the designated files have been searched is determined (step S52). If the answer of the step S52 is NO, the steps S50 and S51 are repeated. In this manner, the designated files are sequentially examined until a file that satisfies the condition of step S50 has been found. If at least one of the files satisfies the condition of the step S50 (YES, step S50), the alarm message of step S53 is displayed. Thereafter, file transfer is interrupted by the procedure described with reference to FIG. 11 or 24 (step S8).

The alarm message shown in FIG. 17 allows the operator to compare the over memory number or short memory size and the size data of designated files, which appears on the picture of the document management application, and easily select files whose designation should be canceled.

Figure 19:
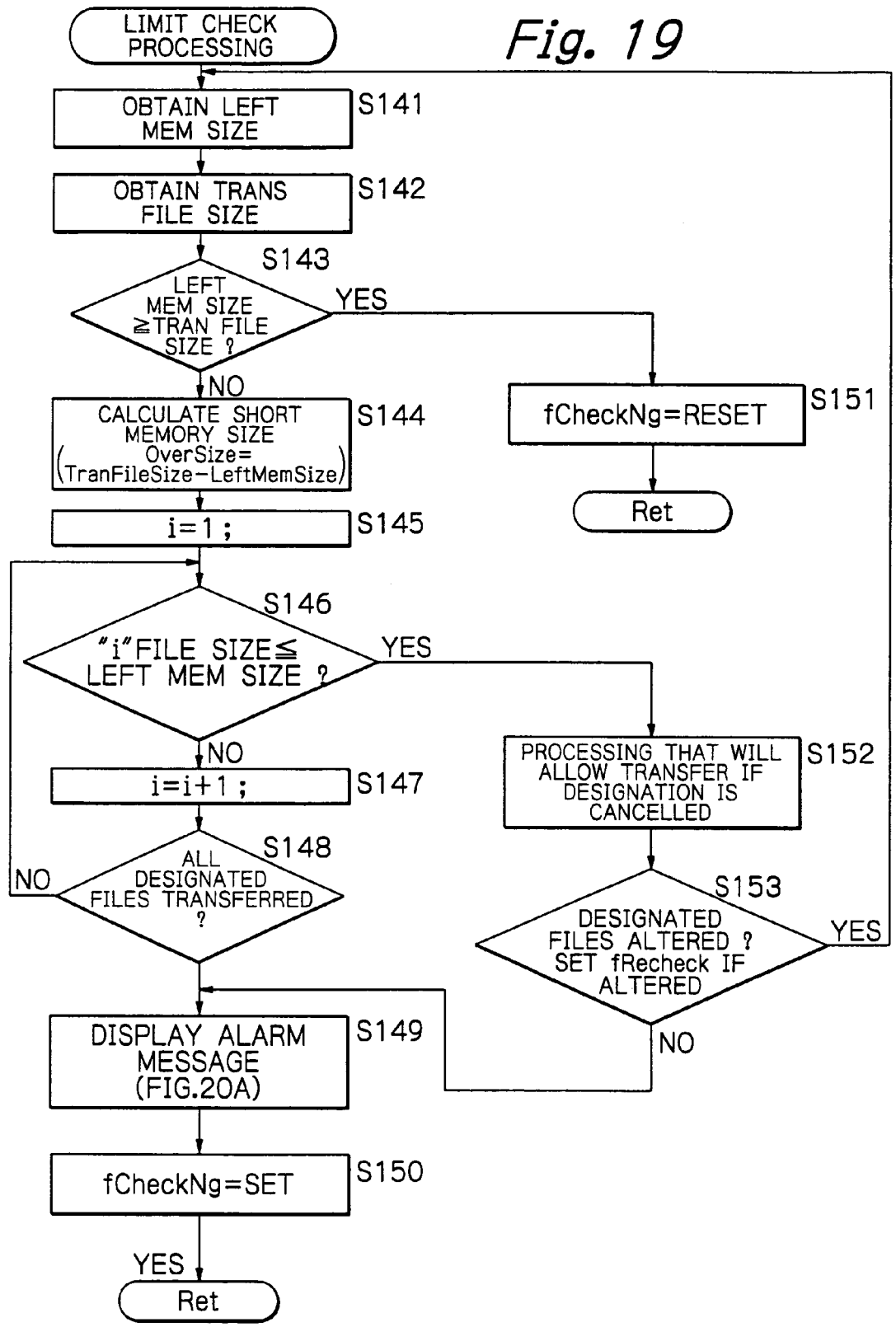
FIG. 19 is a flowchart representative of another specific limit check processing.

Another specific procedure will be described that allows tile transfer to be effected despite the short residual capacity of the destination if the designation of files is canceled. As shown in FIG. 19, the residual capacity of the destination is determined (step S141), and the total capacity of designated files to be transferred is determined (step S142). Whether or not the residual capacity of the destination is greater or equal to the total capacity of designated files is determined (step S143). If the answer of the step S143 is YES, meaning that the residual capacity of the destination is great enough to store all of the files, the check NG flag is reset (step S151). This is followed by the step S9 of FIG. 11 or 24 for executing file transfer.

If the answer of the step S143 is NO, meaning that the residual capacity of the destination is short, the short memory size is calculated by subtracting the residual capacity of the destination from the file size to be transferred. Specifically, to determine a file size file by file, a file number i=1 is set (step S145). Subsequently, whether or not a file #1 and successive files have sizes smaller than the residual capacity of the destination is determined file by file (step S146).

If the answer of the step S146 is YES, meaning that file transfer can be effected if the number of designated files is reduced, there is executed processing assigned to a case wherein file transfer will be allowed if the designation of files is canceled (step S152). The step S152 will be described in detail later. Because the operator may not alter the designated files in the step S152, whether or not the designated files are altered is determined (step S153). If the answer of the step S153 is YES, the operation returns to the step S141. If the answer of the step S153 is NO, an alarm message showing the operator that file transfer is not allowed is displayed (step S149). After the step S149, the check NG flag is set (step S150). Thereafter, the step S8 of FIG. 11 or 24 is executed to interrupt file transfer.

Figure 20A:
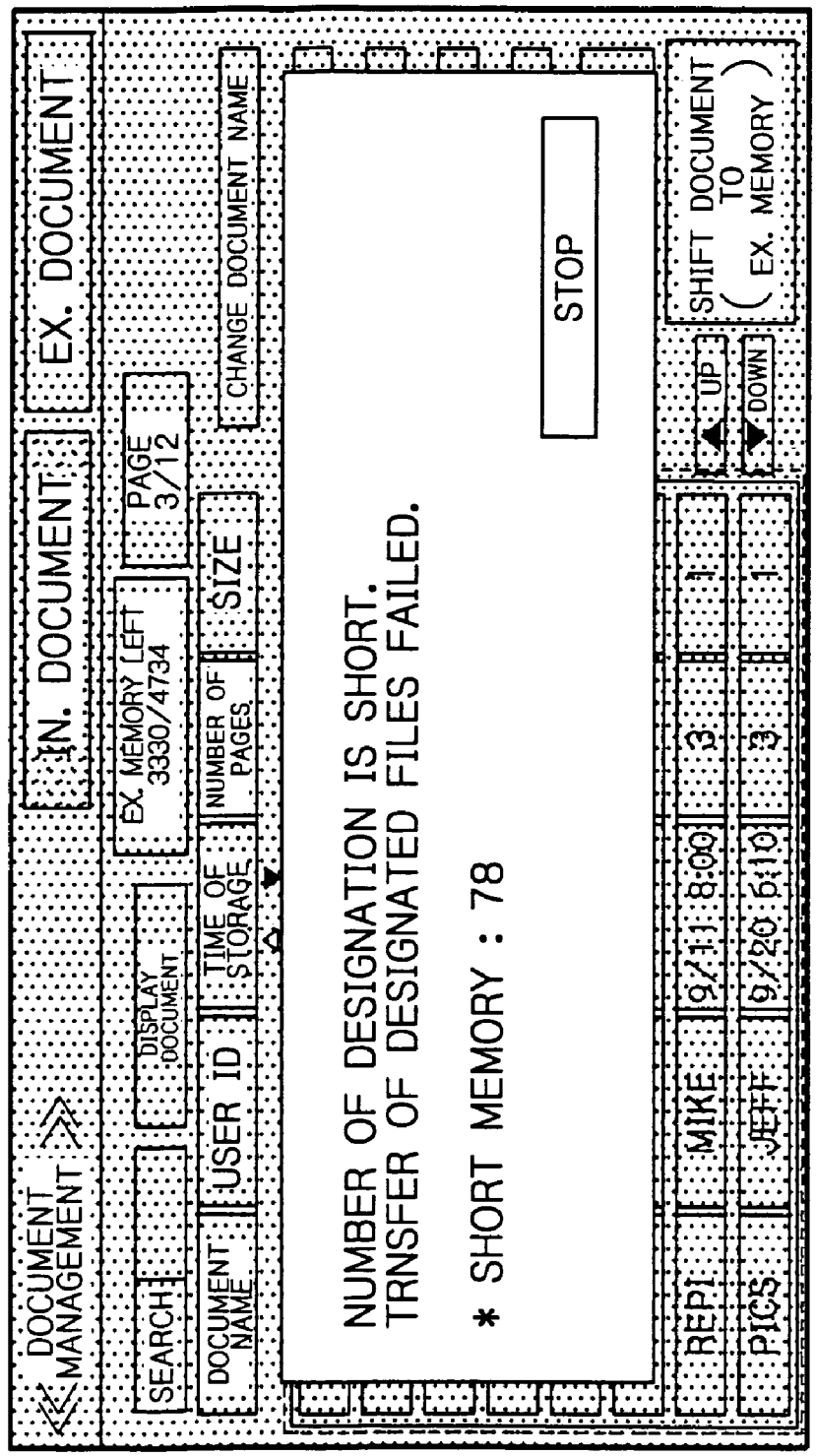
FIGS. 20A and 20B are views each showing a particular specific picture including a message that shows the interruption of file transfer.

If the answer of the step S146 is NO, the file number i is incremented by 1 in order to set the next file number (step S147). Subsequently, whether or not all the designated files have been examined is determined (step S148). If the answer of the step S148 is NO, the steps S146 and 147 are repeated until a file that satisfies the condition of step S146 has been detected. If the answer of the step S148 is YES, the alarm message is displayed (step S149). FIG. 20A shows a specific alarm message indicating a short memory size. The alarm message allows the operator to, e.g., cancel files corresponding to the short memory size while storing the other files. This is also followed by the steps S150 and the step S8 of FIG. 11 or 24.

Figure 20B:
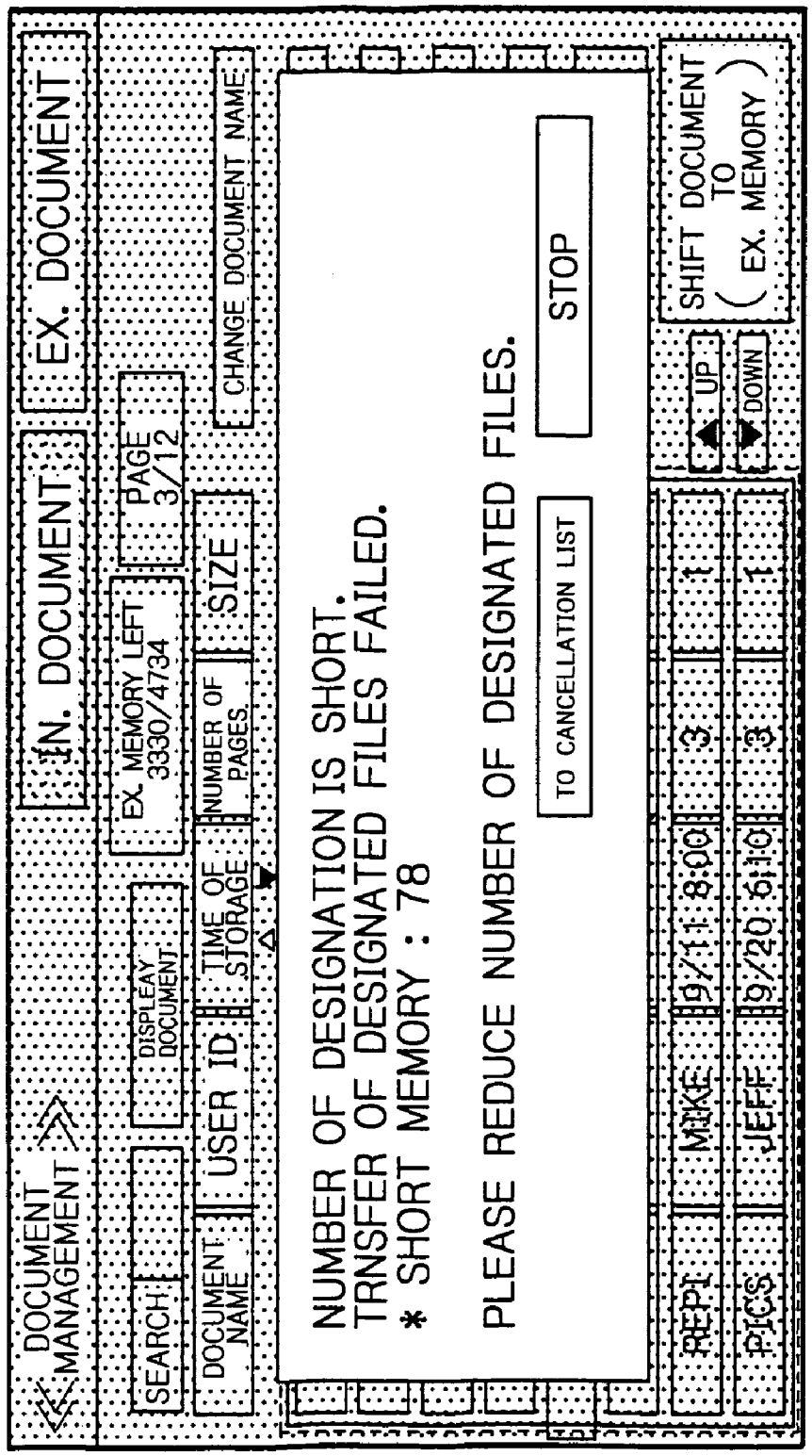
Figure 21:
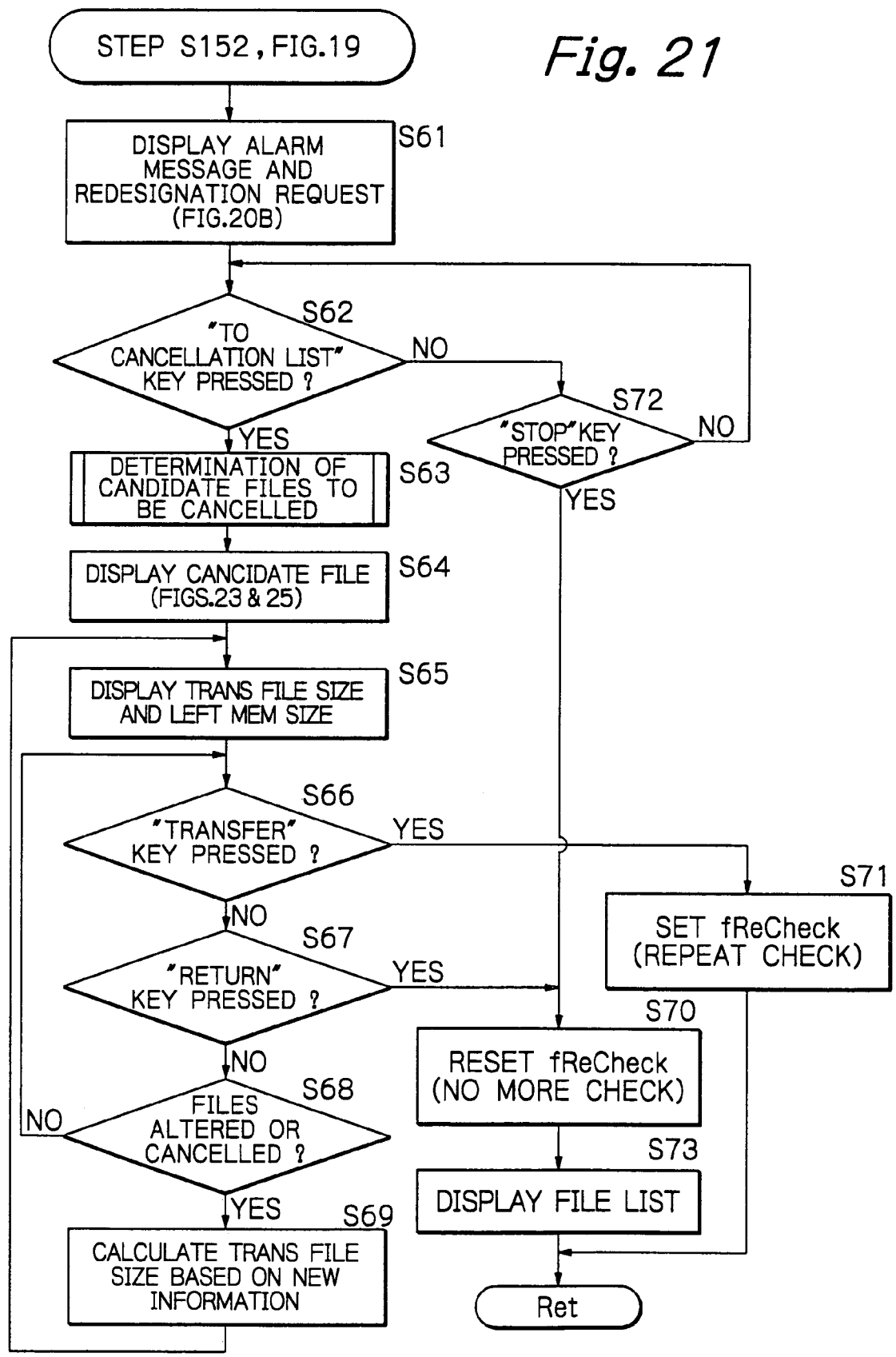
FIG. 21 is a flowchart showing part of the processing of FIG. 19 in detail;.

FIG. 21 shows the step S152 of FIG. 19 in detail. As shown, there are displayed the alarm message showing the operator that file transfer is not allowed (transfer inhibition alarm) and a message showing the operator the short memory size and the fact that file transfer will be allowed if the number of designated files is reduced (redesignation request) (step S61). FIG. 20B shows a specific picture displaying such messages. As shown, the picture additionally displays a cancellation list key.

Whether or not the operator has touched the cancellation list key is determined (step S62). If the answer of the step S62 is NO, whether or not the operator has touched a return key is determined (step S72). If the answer of the step S72 is NO, the step S62 is repeated. If the answer of the step S72 is YES, a flag fReCheck is reset (step S70). If the answer of the step S62 is YES, processing for allowing the operator to determine Riles to cancel is executed (step S63).

FIGS. 23 and 25 each show a particular candidate list generated in the step S63. As shown, the candidate list lists five different files specifically that have been designated (reversed) in FIG. 22. Among the five files, files that can be transferred are reversed, so that the operator can recognize the other files as candidates than may be canceled (step S64). In this condition, when the operator touches a transfer key positioned at the bottom right of the picture shown in FIG.

23 or 25, all the designated files of the file list are transferred to the destination in the step S152 and successive steps of FIG. 19.

Further, the total capacity of the designated files and the residual capacity of the destination are displayed at the top right of the picture of FIG. 23 or 25 (step S65). This allows the operator to manually alter the designated files while recognizing the combination of tiles that can be transferred.

When the operator touches the transfer key (YES, step S66), the flag fReCheck is set in order to again determine whether or not the designated files can be transferred (step S71). This is followed by the step S153 of FIG. 19.

If the answer of the step S66 is NO and if the operator touches the return key (YES, step S67), the usual file designation picture shown in FIG. 22 is again displayed in place of the file designation picture for the transfer mode shown in FIG. 23 or 25. Specifically, the flag fReCheck is reset (step S70) in order to prevent the designated files from being checked again (step S70). Subsequently, the picture showing the file list is displayed (step S73).

Whether or not the operator has again designated files or canceled the designation is determined (step S68) The result of this decision is reflected by the display of the step S65. Specifically, if the answer of the step S68 is YES, the total capacity of newly designated files is calculated (step S69) and displayed so as to allow the operator to confirm the execution or again designate other files. If desired, the short memory capacity of the destination may be substituted for the total capacity of designated files and residual capacity of the destination being displayed.

Figure 22:
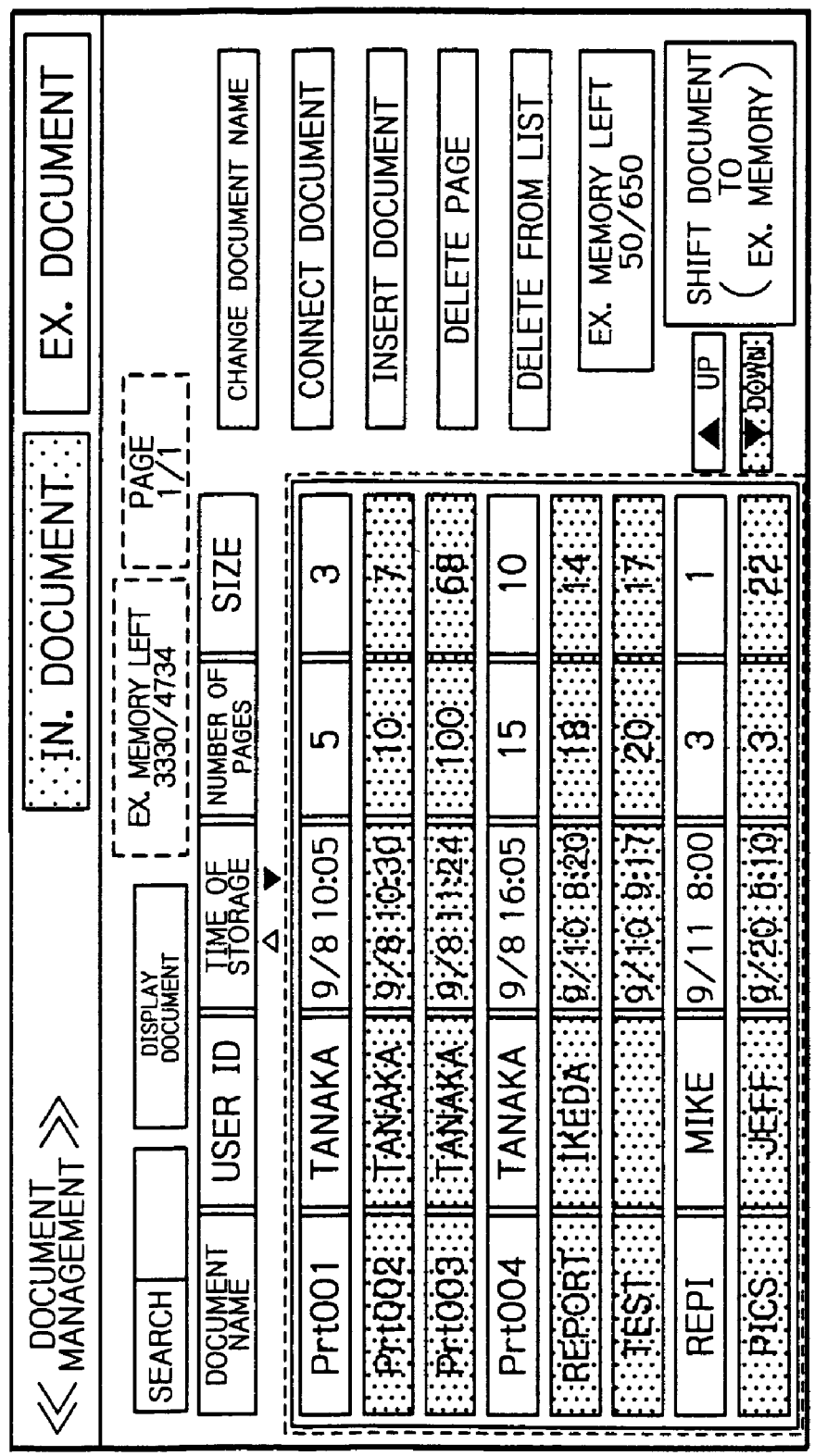
FIG. 22 is a view showing a specific picture to appear in the event of the designation of files to be transferred.

The step S63 shown in FIG. 21 will be described in detail hereinafter. First, the step S63 will be outlined by using the transition of the display. FIG. 22 shows the file designation picture being displayed. In this picture, files designated in the preceding picture are reversed.

Assume that the operator, watching the picture of FIG. 22, touches a "shift document" key, but the residual capacity of the designation is short. Then, the alarm message of FIG. 20B is displayed. When the operator touches a "candidate" key in the picture of FIG. 20B, the candidate list of FIG. 23 or 25 is displayed.

Figure 26:
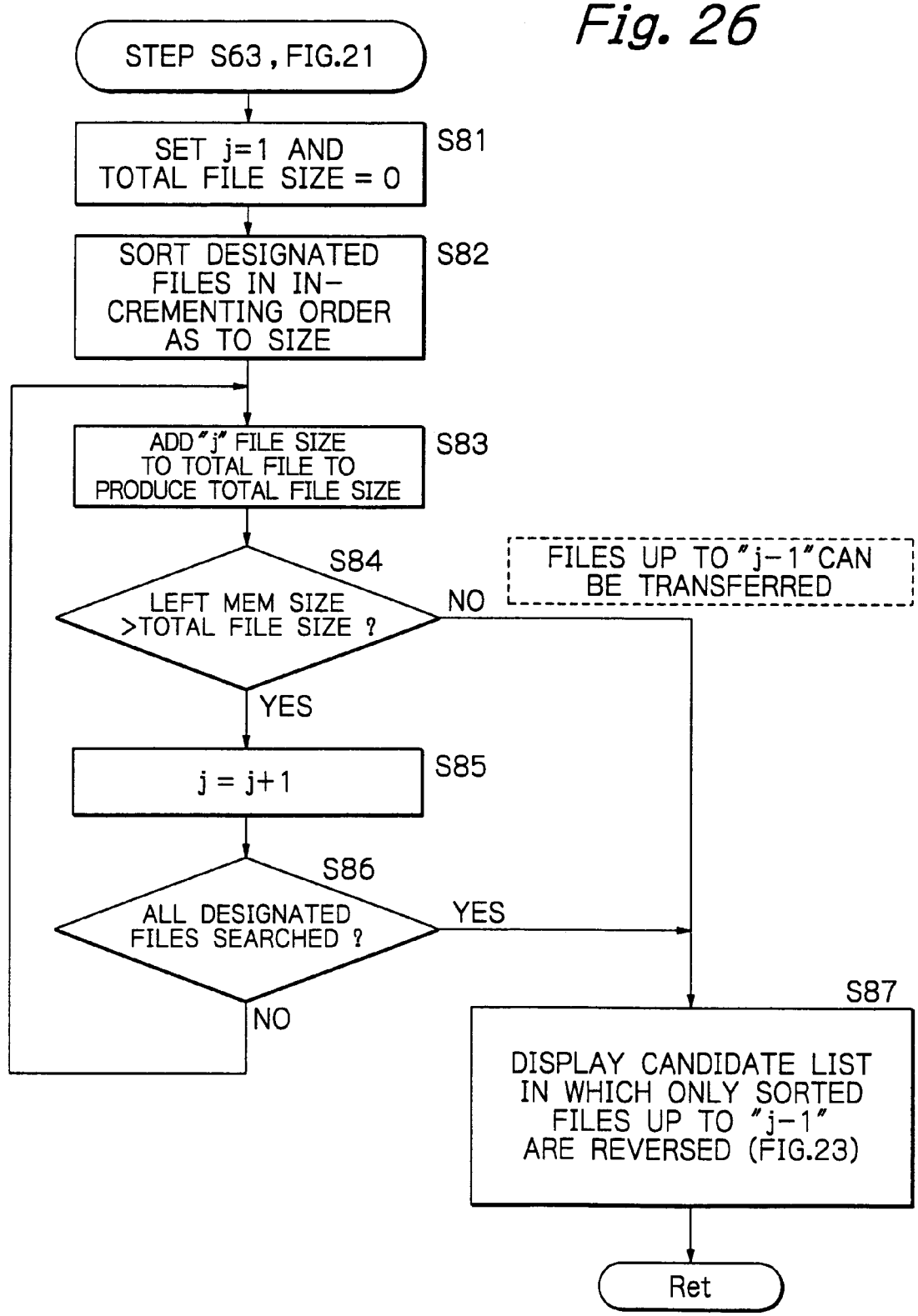
FIG. 26 is a flowchart showing a specific sequence of steps implementing the processing of FIG. 21 in detail.

FIG. 26 shows a procedure for determining the files to be canceled. Briefly, the procedure generates a candidate list by selecting the combination of files, which can be transferred, such that the number of files to be canceled is minimum, i.e., the number of files to be transferred is maximum. This successfully meets the operator's demand even if the residual capacity of the destination is small.

Specifically, as shown in FIG. 26, the initial condition j=1 and a zero total file size are set (step S81). Subsequently, the files designated by the operator (reversed files in FIG. 22) are rearranged in the incrementing order as to the file size (step S82). The file with the smallest file size to the file with the largest file size are sequentially picked up as files that can be transferred. At the same time, each file size picked up is added to the total file size (step S83). Subsequently, whether or not the total file size is smaller than the residual memory capacity of the designation is determined (step S84). If the answer of the step is YES, the file number j is incremented by 1 (step S85). If any other file not searched exists (NO, step S86), the operation returns to the step S83. When the answer of the step S84 changes from YES to NO, it is determined that the files up to the "j–1" file immediately preceding the j-th file, at which the answer of the step S84 becomes NO, can be transferred. Subsequently, a combination of such files that maximizes the number of files to be transferred is determined. The file designation list (reversed) and candidate list (non-reversed) shown in FIG. 23 are generated on the basis of the above combination and displayed (step S87).

Figure 27B:
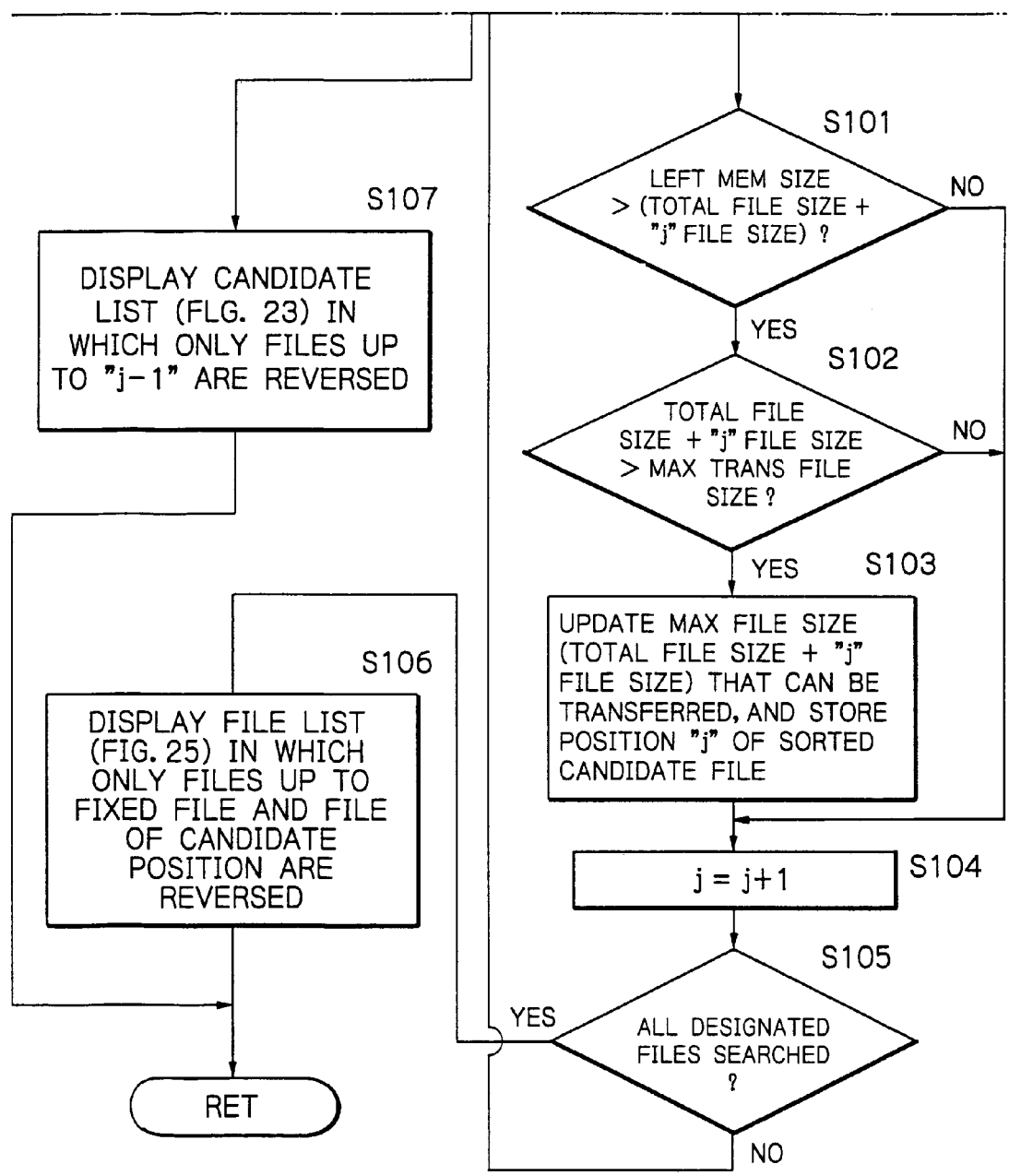
FIG. 27 is a flowchart that is an improved version of the operation shown in FIG. 26.

FIG. 27 shows a procedure that is an improved version of the procedure or FIG. 26. The procedure to be described generates the candidate list by using the same criterion as the procedure of FIG. 26. In addition, when a plurality of combinations of files that can be transferred have the same number of files, the procedure to be described gives priority to a combination having the largest file size that can be transferred.

Specifically, as for the files shown in FIG. 23, two different combinations of three files that can be transferred exist:

combination 1: document names Ptr002, REPORT and TEST total file capacity 38 combination 2: document names Ptr002, REPORT and PICS total file capacity 43

The algorithm of the procedure shown in FIG. 26 will select the combination 1 because it sequentially picks up the files in the incrementing order as to file size. By contrast, the procedure to be described selects the combination 2 having the largest file size that can be transferred.

As shown in FIG. 27, steps S91 through S96 are identical with the steps S81 through 86 of FIG. 26. In a file list sorted in order of size in the steps up to the step S96, the files up to the "j–2" file can be transferred. A step S97 and successive steps determine the remaining one file. The files following the "j–2" file each are added to the total file size (capacity) of the preceding files, so that a file having the largest file size that can be transferred is found on the basis of the sum. The resulting combination of the files is displayed.

Specifically, whether or not j is greater than 2 is determined (step S97). If the answer of the step S97 is NO, the detection of a file having the largest file size is not executed. Therefore, it is determined that the files up to the "j–1" file can be transferred while the "j" file and successive files are not selected. Such files are listed in the designated file list (reversed) and candidate list (non-reversed) shown in FIG. 23 (step S107). After the step S107, the procedure of FIG. 27 returns.

If the answer of the step S97 is YES, the position of the sorted "j–2" file that can be transferred is stored (step S98). The initial total file size is produced by subtracting the "j" file size from the total file size and then subtracting the "j–1" file size from the resulting difference (step S99). Zero is selected as the initial largest file size to be transferred (step S108). Subsequently, j=j–1 is set.

Whether or not the sum of the total file size and "j" file size is smaller than the residual capacity of the destination is determined (step S101). subsequently, the sum of the total file size and "j" file size is greater than the largest file size that can be transferred is determined (step S102). If the answers of the steps S101 and S102 are YES, the largest file size that can be transferred is updated to the sum of the total file size and "j" file size. At the same time, the position of the above candidate file to be selected is stored (step S103).

Subsequently, j is incremented by 1 to check the next file (step S104). If any file not searched exists (NO, step S105), the operation returns to the step S101. If the answer of the step S105 is YES, meaning that all the files have been searched, a step S106 is executed. In the step S106, the files up to the fixed file to be transferred whose position has been stored in the step S98 and the candidate file whose position has been determined in the step S103 are displayed in the designated state. At the same time, the other files are displayed in the non-designated state (step S106). FIG. 25 shows the resulting list listing the candidates to be canceled As shown, the combination 2 is selected; Ptr002 and REPORT are the fixed files according to the sorting order while PICS is the candidate file according to the sorting order and determined in the step S103.

Another specific sequences of steps for implementing the step S63 shown in FIG. 21 will be described hereinafter. First, the steps will be described by using the transition of the picture. FIG. 28 shows the designated files being displaced. The designated files shown in FIG. 28 are reversed when selected in the initial picture that appears before the picture of FIG. 22.

Assume that the operator touches the "shift document" key in the picture of FIG. 28, but the residual capacity of the destination is short. Then, the alarm message of FIG. 20B is displayed. When the operator touches the "cancellation list" key in the picture of FIG. 20B, a cancellation candidate list shown in FIG. 29 is displayed. Candidate tiles to be canceled are determined on the basis of preselected criteria, so that the operator can distinguish the candidate files to be canceled from the other files.

Figure 30:
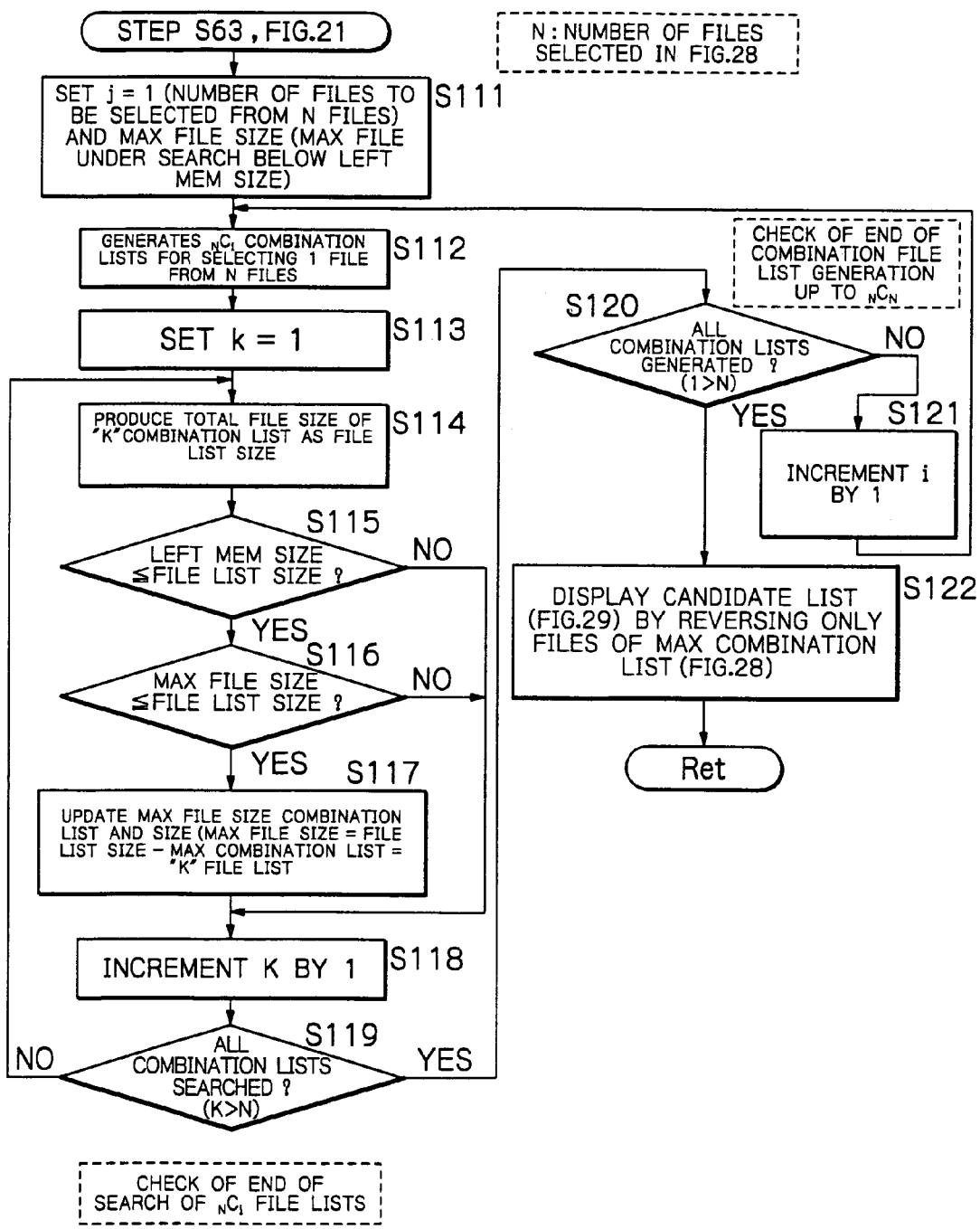
FIG. 30 is a flowchart showing another specific sequence of steps implementing the processing of FIG. 21 in detail.

FIG. 30 shows a specific procedure for determining the files to be canceled. To generate the list of candidates to be canceled, the procedure selects a combination of files that can be transferred such that the residual capacity of the destination becomes minimum after the transfer of designated files. In addition, if a plurality of combinations of files to be canceled exist when files to be canceled are determined on the basis of the above criterion, the files are determined such that the number of files to be transferred is maximum.

The following parameters are used in this specific procedure:

N: number of desired files to be transferred (four in FIG. 28)

i: number of files to be selected from N files and combined (corresponding to i of $_NC_i$)

maximum file size: maximum file size existing in combinations of files determined to be smaller than destination's residual capacity during search of $$\sum_{i=1}^{N} {}_NC_i$$

files maximum file list: among combinations of files determined to be smaller than destination's residual capacity during search of $$\sum_{i=1,}^{N} {}_NC_i$$

files combination of files having the maximum file size k: position with respect to $_NC_i$ file combination lists produced by $_NC_i$ As shown in FIG. 30, to pick up the files (reversed in FIG. 28) selected by the operator, the initial condition of i=1 and the maximum (MAX) file size=0 are set (step S111) Subsequently, $_NC_i$ combination file lists each listing i files selected from N designated files are generated (step S112).

A position k=1 is attached to a file list generated by i=1 (step S113). The total file size of the files listed in the "k" file combination list is produced as a file list size (step S114). If the tile list size is smaller than the residual capacity of the destination (YES, step S115), but greater than the maximum file size (YES, step S116), data representative of "maximum file size=file list size" and "maximum combination file list="k" combination file list" are stored (step S117) As for i=1 and k=1, the above data are continuously stored.

Subsequently, after the position k has been incremented by 1 (step S118), whether or not all of the $_NC_i$ file lists have been searched, i.e., k is greater than N is determined (step S119) If the answer of the step S119 is NO, the step S114 and successive steps are repeated with the next combination file list. When k reaches N, the search of the combination file lists based on i=1 ends.

After the search of the combination file lists $_NC_i$, whether or not all at $_NC_i$ (i=1 through N) combination file lists have been searched is determined (step S120). If the answer of the step S120 is NO, i is incremented by 1 (step S121) in order to search the next $_NC_i$ combination file lists (steps S112 through S119). After the last Combination file list $_NC_N$ has been searched, i.e., if i is greater than N (YES, step S120), the file list represented by the latest data updated and stored in the step S117 is displayed. In the file list, the files of the maximum combination file list are reversed while the other files are not reversed. In this manner, the file list lists candidate files to be canceled.

As the step S116 indicates, when the file list size is equal to the maximum file size, priority is given to the maximum file size. It follows that when a plurality of file combinations having the same file list size exist, a file combination including the greatest number of files is adopted.

The step S63 included in the procedure of FIG. 30 may be improved, as will be described hereinafter. The improved procedure uses an extended function of specifying the order of selection. Specifically, when the operator touches a file being displayed on the touch panel 31, the file selected is reversed while, at the same time, a number "designated file number+1" is displayed in an item "Order". By using this function, the operator is capable of specifying a desired printing order of files or a desired deleting order of files.

Files to be canceled are determined such that the residual memory capacity of the destination becomes minimum after file transfer or such that the number of files to be transferred is maximum, as stated earlier. At this instant, if a plurality of combinations of files to be deleted exist, the improved procedure to be described determine files to be deleted such that the number of files of low numbers attached by the above-mentioned specified order of selection is maximum.

For example, assume that files are designated as shown in FIG. 28, and that the residual capacity of the destination is 90. Then, the following two different combinations that satisfy the residual capacity of 90 and maximize the number of files exist:

combination 1: document name Ptr002, Ptr003 and TEST total file capacity 90 combination 2: document name Ptr003, Ptr004 and TEST total file capacity 90

The criterion based on the specified selection order particular to this procedure is applied to the above specific condition. Specifically, in the combination 1, the positions of the documents Ptr002, Ptr003 and TEST as to the selection order are "1", "3" and "2", respectively. In the combination 2, the positions of the documents Ptr003, Ptr004 and TEST as to the selection order are "3", "4" and "2", respectively. Therefore, the combination 1 has more files of low numbers than the combination 2 and is selected. This scheme desirably takes account of the operator's intention.

Figure 31B:
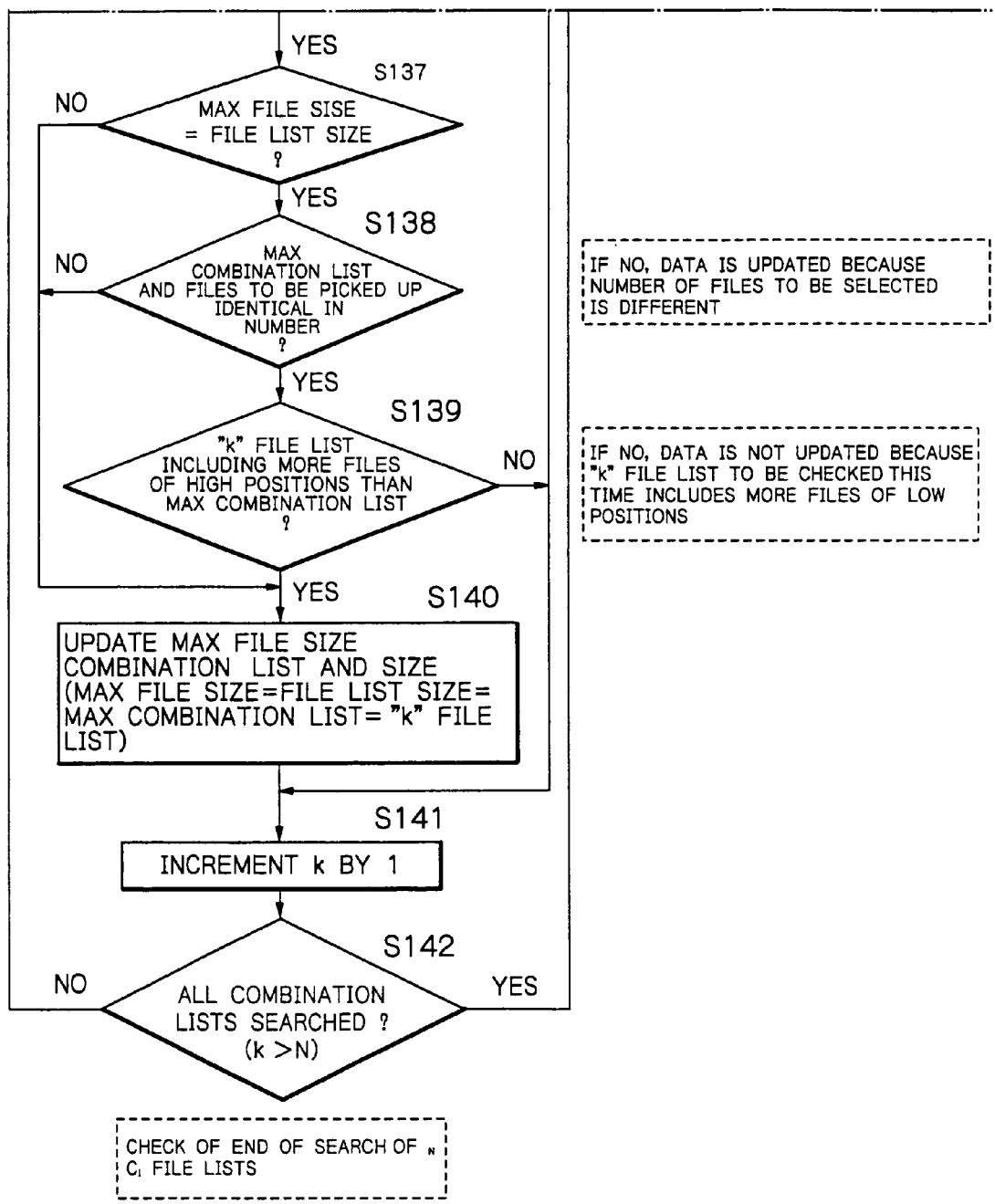
FIG. 31 is a flowchart showing an improved version of the sequence of FIG. 30.

Specifically, as shown in FIG. 31, steps S137 through 139 are inserted between the steps S116 and 117 of FIG. 30. During the steps S134 through S142, the combination file lists $_NC_N$ are sequentially searched to find a file list having the maximum file list size, as stated earlier. During this process, whether or not the combination file list $_NC_N$ being dealt with has a file size greater than the maximum size having been found is determined (step S136). If the answer of the step S136 is YES, whether or not the above two file sizes are equal is determined (step S139).

If the answer of the step S139 is YES, whether or not the number of files listed in the file list $_NC_N$ is equal to the number of files listed in the maximum combination file list is determined (step S138). If the answer of the step S138 is YES, whether or not the "k" combination file list includes more files of high positions as to the selection order than the maximum combination file list is determined (step S139). If the answer of the step S139 is YES, the "k" combination file list is selected. As a result, the data stored in the step S140 is replaced with the data of the combination list to be checked this time.

If the answer of the step S139 is NO, meaning that the "k" file list to be checked this time includes many files of low numbers as to the selection order, the data stored in the step S140 is not updated. By contrast, when the numbers of files are equal, the procedure of FIG. 30 does not give consideration to the selection order of the file list.

Assume that the residual capacity of the destination is short, but designated files can be transferred if the number of pages is reduced. Then, the procedure of FIG. 31 reflects the operator's intention more than the procedure of FIG. 30.

In various procedures described above, a file that is a single page or a plurality of pages is dealt with as a minimum unit and selected and transferred on a page basis. The present invention is, of course, practicable even when the minimum unit is a page and selected and transferred on a page basis.

In accordance with the present invention, a controller included in an image data storing device or an image processing device for processing image data is loaded with a program for executing the above-described image data transfer control method. The program is stored in a conventional recording medium that can be read by a computer and installed in the controller.

In summary, it will be seen that the present invention achieves various unprecedented advantages, as enumerated below.

(1) When image data are transferred between different storing means, whether or not storing means included in a destination is capable of fully storing the image data is determined. The transfer is interrupted in accordance with the result of the above decision. This obviates transfer failure that may occur during transfer due to a memory-full condition, and thereby frees the storing means from wasteful operations while promoting the effective use of the storing means. Particularly, a CD-R or similar write limiting type of storing means does not allow image data to be again written in its region once used. Also, a CD-RW, which is another write limiting type of storing means, is limited in the guaranteed number of times of writing. In the event of transfer to an external storing using such a storing medium, the decision on the allowability of transfer effected beforehand not only obviates wasteful operations, but also enhances the efficient use of the storing medium. Even during transfer, the capacity of the destination is examined in order to determine whether or not file transfer is allowable. This insures the decision on the allowability of transfer to prepare for file storage that may be derived from another function during transfer. It is therefore possible to obviate troubles ascribable to the above occurrence and to rapidly execute processing for dealing with an estimated interruption.

(2) To determine whether or not file transfer is allowable, the residual capacity of a destination and the total capacity of files or pages designated, but not transferred, or the number of files or pages are compared. This allows the advantage (1) to be easily attained.

(3) Assume that one of the two storing means is implemented by a CD or similar recording means that does not allow a plurality of accesses to occur at the same time. When image data are written to such a recording medium (in this case, the result of the initial limit check does not vary), whether or not file transfer is allowable is determined only before the start of file transfer. This also obviates wasteful operations and realizes high performance.

(4) Assume that use is made of a CD-R, CD-RW or similar write limiting type of storing medium each having the previously stated particular limitation. Then, whether or not file transfer is allowable is determined beforehand. This also obviates wasteful operations and enhances the efficient use of the recording medium.

(5) Whether or not the residual capacity of the destination is zero is determined. Therefore, when a memory-full condition is likely to occur during file transfer, a check result can be easily attained and allows the memory-full condition to be readily coped with.

(6) Assume that the destination is built-in storing means of the type allowing write accesses to occur at the same time. Then, to determine whether or not file transfer is allowable before file transfer, use is made of means for comparing the residual memory capacity or the number of residual memory files of the destination and the total capacity of, among the designated file image data, files or pages not transferred or the number of such files or pages. After the file transfer, use is made of means for determining whether or not the residual memory capacity of the destination is zero. This implements a check adequate for the transfer to storing means of the type described.

(7) When file transfer is not allowed, an over memory capacity or the amount of image data of designated files or pages to be transferred and the residual capacity of the destination are displayed. This provides the operator with useful information When the operator manually selects files to cancel, facilitating the selection.

(8) Use is made of means for determining, when the transfer of initially designated files or pages is not allowed, determining whether or not transfer will be allowed if the number of files or pages is reduced. This shows the operator the possibility of transfer of part of the initially designated files or pages and urges the operator to alter the designation, insuring high performance.

(9) Processing is executed to determine files or pages whose designation should be canceled to effect transfer. The operator can therefore easily search for and determine files or pages to cancel. This also insures high performance.

(10) Files or pages to be canceled are determined such that the number of files or pages to be canceled is minimum. Therefore, even when the residual capacity of the destination is small, files or pages are selected and transferred in accordance with the operator's demand.

(11) When a plurality of combinations of files or pages that minimize the number of files or pages to be canceled exist, files or pages to be canceled are selected such that the residual capacity of the destination becomes minimum. This promotes the effective use of the storing means of the destination and allows files or pages to be selected and transferred by a single operation in such a manner as to meet the user's demand as far as possible.

(12) Files or pages to be canceled are determined such that the residual capacity of the destination becomes minimum after transfer. Therefore, even if the residual capacity of the destination is small, files or pages are selected and transferred in accordance with the operator's demand.

(13) Assume that a plurality of files or pages that minimize the residual capacity of the destination after transfer exist. Then, files or pages to be canceled are determined such that the number of files or pages to be transferred is maximum. This also promotes the effective use of the storing means of the destination and allows files or pages to be selected and transferred by a single operation in such a manner as to meet the user's demand as far as possible.

(14) When more combinations of files or pages to be canceled exist, files or pages to be canceled are determined such that the number of files or pages of low numbers with respect to the order of designation is maximum This also promotes the effective use of the storing means of the destination and allows files or pages to be accurately determined while reflecting the operator's indication.

(15) Display means informs the operator of the presence of files or pages that can be transferred if the tile designation is canceled, further promoting easy operation.

(16) Files or pages to be canceled and files or pages selected are displayed while being distinguished from each other. The operator can therefore reconsider files to transfer and manually designate desired files. This allows the desired files or pages to be transferred in accordance with the operator's demand.

(17) After the transfer of files or pages selected, the files or pages canceled are displayed. Therefore, if all the desired files can be transferred to external media by, e.g., the replacement of the media of the storing means, easy operation is promoted.

Various modifications will become possible for those skilled in the art after receiving the teachings of the present invention without departing from the scope thereof.

What is claimed is:

1. An image printing device, comprising:
    an image data storing device, including
        at least first and second storing means different in storing format from each other, each for storing image data input via inputting means, said first storing means including an external storage and said second storing means including at least one of a video memory and a hard drive;
        transfer control means for controlling a transfer of the image data between said first and second storing means, the image data including an arbitrary selection of one or plural or any of files included in the image data, selected by an operator, to be transferred; and
    checking means included in said transfer control means for determining, prior to a start of transfer of said image data from said second storing means to said first storing means, whether or not said external storage of said first storage means, which is included in a destination, to which the image data is to be transferred from said second storing means, has a capacity great enough to store said image data of all the files selected by the user to be transferred, the checking means setting a flag when the capacity of said external storage is less than a total capacity of all the files selected by the user to be transferred,
    wherein when the flag is set transfer of the files selected by the user is interrupted before a first of the files is started to be transferred.

2. A device as claimed in claim 1, wherein when image files or pages are designated as objects of transfer, said checking means compares a residual memory capacity of the first storing means of the destination and a total amount of image data-existing in, among designated image files or pages, image files or pages not transferred and determines whether or not a transfer is allowable.

3. A device as claimed in claim 2, wherein when the transfer between said first and second storing means is writing the image data in storing means that inhibits a plurality of simultaneous write accesses, said checking means determines only before a start of the transfer whether or not the transfer is allowable.

4. A device as claimed in claim 3, wherein said storing means that inhibits a plurality of simultaneous write accesses uses a write limiting type of storing medium.

5. A device as claimed in claim 2, further comprising display means for displaying, when said checking means does not allow the transfer because the total amount of the image data exceeds the residual capacity of the destination, a short memory capacity or the total amount of the image data of the image files or the pages designated and the residual capacity of the destination.

6. A device as claimed in claim 2, wherein when the transfer of the image data of the image files or the pages initially designated is not allowed, said checking means determines whether or not said image data can be transferred if a number of the image files or a number of the pages is reduced.

7. A device as claimed in claim 2, wherein when the transfer of the image data of the image files or the pages initially designated is not allowed, said checking means determines whether or not said image data can be transferred if a number of the image files or a number of the pages is reduced, while determining the image files or the pages whose designation should be canceled.

8. A device as claimed in claim 7, wherein said checking means determines the image files or the pages whose designation should be canceled such that a minimum number of image files or pages is canceled.

9. A device as claimed in claim 8, wherein when a plurality of combinations of image files or pages whose designation should be canceled exist, said checking means determines the image files or the pages to be canceled such that the residual capacity of the destination becomes minimum.

10. A device as claimed in claim 8, wherein when a plurality of combinations of image files or pages whose designation should be canceled exist, said checking means determines the image files or the pages to be canceled such that, among the image files or the pages that said transfer control means stores and manages as the objects of transfer, the number of files having low numbers in order of designation is maximum.

11. A device as claimed in claim 7, wherein said checking means determines the image files or the pages whose designation should be canceled such that the residual capacity of the destination becomes minimum after the transfer.

12. A device as claimed in claim 11, wherein when a plurality of combinations of image files or pages that minimize the residual capacity of the destination after the transfer exist, said checking means determines the image files or the pages to be canceled such that a number of files or pages to be transferred becomes maximum.

13. A device as claimed in claim 7, further comprising:
display means for displaying the image files or the pages to be canceled.

14. A device as claimed in claim 13, wherein said display means displays the files or the pages to be canceled together with the files or the pages to be transferred while distinguishing said files or the pages from each other.

15. A device as claimed in claim 7, further comprising display means for displaying, after the transfer of the files or the pages designated, the files or the pages whose designation has been canceled.

16. A device as claimed in claim 1, wherein when image files or pages are designated as objects of transfer, said checking means compares a number of residual files or residual pages available at the destination and a number of the files or pages designated as objects of transfer, but not transferred, and determines whether or not the transfer is allowable on the basis of a relation between said numbers.

17. A device as claimed in claim 1, wherein said checking means determines whether or not the transfer is allowable by determining whether or not the residual capacity of the destination is zero.

18. A device as claimed in claim 17, wherein when the destination comprises first storing means that allows a plurality of simultaneous accesses, said checking means determines, after a start of the transfer, whether or not a transfer is allowable by determining whether or not the residual capacity of said destination is zero.

19. An image printing device, comprising:
an image processing apparatus, including
inputting means comprising an image data storing device, which includes an interface, for receiving image data output from at least one of image reading means or an outside of said image processing apparatus; and
image forming means for forming an image in accordance with the image data output from said image data storing device;
said image printing device further including an image data storing device comprising:
at least first and second storing means different in storing format from each other, each for storing image data input via said inputting means, said first storing means including an external storage and said second storing means including at least one of a video memory and a hard drive;
transfer control means for controlling transfer of the image data between said first and second storing means, the image data including an arbitrary selection of one or plural or any of files included in the image data, selected by an operator, to be transferred; and
checking means included in said transfer control means for determining, prior to a start of transfer of said image data from said second storing means to said first storing means, whether or not said external storage of said first storage means, which is included in a destination, to which the image data should be transferred from said second storage means, has a capacity great enough to store said image data of all the files selected by the user to be transferred, the checking means setting a flag when the capacity of said external storage is less than a total capacity of all the files selected by the user to be transferred,
wherein when the flag is set transfer of the files selected by the user is interrupted before a first of the files is started to be transferred.

20. A method of controlling a transfer of image data between a plurality of storing means in an image printing apparatus, comprising:
transferring image data from a first storing means to a second storing means, which are different in storing format from each other, said second storing means including an external storage and said first storing means including at least one of a video memory and a hard drive, the image data including an arbitrary selection of one or plural or any of files included in the image data, selected by an operator, to be transferred, said transferring including
determining whether said second storing means, which is included in a destination to which the image data should be transferred, has a capacity great enough to store said image data, prior to a start of transfer of said image data from said first storing means of all the files selected by the user to be transferred, the determining setting a flag when the capacity of said external storage is less than a total capacity of all the files selected by the user to be transferred, and
wherein when the flag is set transfer of the files selected by the user is interrupted before a first of the files is started to be transferred.

21. A method as claimed in claim 20, wherein when image files or pages are designated as objects of transfer, a residual capacity of the second storing means of the destination and a total amount of image data existing in, among designated image files or pages, image files or pages not transferred are compared to thereby determine whether or not a transfer is allowable.

22. A method as claimed in claim 21, wherein when the transfer between said plurality of storing means is writing the image data in storing means that inhibits a plurality of simultaneous write accesses, whether or not the transfer is allowable is determined only before a start of the transfer.

23. A method as claimed in claim 22, wherein said storing means that inhibits a plurality of simultaneous write accesses uses a write limiting type of storing medium.

24. A method as claimed in claim 21, wherein when the transfer is not allowed because the total amount of the image data exceeds the residual capacity of the destination, a short memory capacity or the total amount of the image data of the image files or the pages designated and the residual capacity of the destination are displayed.

25. A method as claimed in claim 21, wherein when the transfer of the image data of the image files or the pages initially designated is not allowed, whether or not said image data can be transferred if a number of the image files or a number of the pages is reduced is determined.

26. A method as claimed in claim 21, wherein when the transfer of the image data of the image files or the pages initially designated is not allowed, whether or not said image data can be transferred if a number of the image files or a number of the pages is reduced is determined with the image files or the pages whose designation should be canceled being determined.

27. A method as claimed in claim 26, wherein the image files or the pages whose designation should be canceled are determined such that a minimum number of image files or pages is canceled.

28. A method as claimed in claim 27, wherein when a plurality of combinations of image files or pages whose designation should be canceled exist, the image files or the pages to be canceled are determined such that the residual capacity of the destination becomes minimum.

29. A method as claimed in claim 27, wherein when a plurality of combinations of image files or pages whose designation should be canceled exist, the image files or the pages to be canceled are determined such that, among the image files or the pages designated as the objects of transfer and managed as to an order of designation, the number of files having low numbers in the order of designation is maximum.

30. A method as claimed in claim 26, wherein the image files or the pages whose designation should be canceled are determined such that the residual capacity of the destination becomes minimum after the transfer.

31. A method as claimed in claim 30, wherein when a plurality of combinations of image files or pages that minimize the residual capacity of the destination after the transfer exist, the image files or the pages to be canceled are determined such that a number of files or pages to be transferred becomes maximum.

32. A method as claimed in claim 26, wherein the image files or the pages to be canceled are displayed.

33. A method as claimed in claim 32, wherein the files or the pages to be canceled are displayed together with the files or the pages to be transferred while being distinguished from each other.

34. A method as claimed in claim 26, after the transfer of the files or the pages designated, the files or the pages whose designation has been canceled are displayed.

35. A method as claimed in claim 20, wherein when image files or pages are designated as objects of transfer, a number of residual files or residual pages available at the destination and a number of the files or pages designated as objects of transfer, but not transferred, are compared to thereby determine whether or not the transfer is allowable on the basis of a relation between said numbers.

36. A method as claimed in claim 20, wherein whether or not the transfer is allowable is determined by determining whether or not the residual capacity of the destination is zero.

37. A method as claimed in claim 36, wherein when the destination comprises storing means that allows a plurality of simultaneous accesses, after a start of the transfer, whether or not a transfer is allowable is determined by determining whether or not the residual capacity of said destination is zero.

38. An image printing device, comprising:
an image data storing device, including
at least first and second storing devices different in storing format from each other, each configured to store image data input via an inputting device, said first storing device including an external storage and said second storing device at least one of a video memory and a hard drive;
a transfer controller configured to control transfer of the image data between said first and second storing devices, the image data including an arbitrary selection of one or plural or any of files included in the image data, selected by an operator, to be transferred; and
a checking device included in said transfer controller and configured to determine, prior to a start of transfer of said image data from said second storing device to said first storing device, whether or not said external storage of said first storage device, which is included in a destination, to which the image data should be transferred from said second storage device, has a capacity great enough to store said image data of all the files selected by the user to be transferred, the checking device setting a flag when the capacity of said external storage is less than the total capacity of all the files selected by the user to be transferred, wherein said image printing device is further configured to output to a sheet an image corresponding to said image data, and
when the flag is set transfer of the files selected by the user is interrupted before a first of the files is started to be transferred.

39. A device as claimed in claim 38, wherein when image files or pages are designated as objects of transfer, said checking device compares a residual memory capacity of the storing device of the destination and a total amount of image data existing in, among designated image files or pages, image files or pages not transferred and determines whether or not a transfer is allowable.

40. A device as claimed in claim 39, wherein when the transfer between said first and second storing devices is writing the image data in a storing device that inhibits a plurality of simultaneous write accesses, said checking device determines only before a start of the transfer whether or not the transfer is allowable.

41. A device as claimed in claim 40, wherein said storing device that inhibits a plurality of simultaneous write accesses uses a write limiting type of storing medium.

42. A device as claimed in claim 39, further comprising a display configured to display, when said checking device does not allow the transfer because the total amount of the image data exceeds the residual capacity of the destination, a short memory capacity or the total amount of the image data of the image files or the pages designated and the residual capacity of the destination.

43. A device as claimed in claim 39, wherein when the transfer of the image data of the image files or the pages initially designated is not allowed, said checking device determines whether or not said image data can be transferred if a number of the image files or a number of the pages is reduced.

44. A device as claimed in claim 39, wherein when the transfer of the image data of the image files or the pages initially designated is not allowed, said checking device determines whether or not said image data can be transferred if a number of the image files or a number of the pages is reduced, while determining the image files or the pages whose designation should be canceled.

45. A device as claimed in claim 44, wherein said checking device determines the image files or the pages whose designation should be canceled such that a minimum number of image files or pages is canceled.

46. A device as claimed in claim 45, wherein when a plurality of combinations of image files or pages whose designation should be canceled exist, said checking device determines the image files or the pages to be canceled such that the residual capacity of the destination becomes minimum.

47. A device as claimed in claim 45, wherein when a plurality of combinations of image files or pages whose designation should be canceled exist, said checking device determines the image files or the pages to be canceled such that, among the image files or the pages that said transfer controller stores and manages as the objects of transfer, the number of files having low numbers in order of designation is maximum.

48. A device as claimed in claim 44, wherein said checking device determines the image files or the pages whose designation should be canceled such that the residual capacity of the destination becomes minimum after the transfer.

49. A device as claimed in claim 48, wherein when as plurality of combinations of image files or pages that minimize the residual capacity of the destination after the transfer exist, said checking device determines the image files or the pages to be canceled such that a number of files or pages to be transferred becomes maximum.

50. A device as claimed in claim 44, further comprising:
a display configured to display the image files or the pages to be canceled.

51. A device as claimed in claim 50, wherein said display displays the files or the pages to be canceled together with the files or the pages to be transferred while distinguishing said files or the pages from each other.

52. A device as claimed in claim 44, further comprising a display configured to display, after the transfer of the files or the pages designated, the files or the pages whose designation has been canceled.

53. A device as claimed in claim 38, wherein when image files or pages are designated as objects of transfer, said checking device compares a number of residual files or residual pages available at the destination and a number of the files or pages designated as objects of transfer, but not transferred, and determines whether or not the transfer is allowable on the basis of a relation between said numbers.

54. A device as claimed in claim 38, wherein said checking device determines whether or not the transfer is allowable by determining whether or not the residual capacity of the destination is zero.

55. A device as claimed in claim 54, wherein when the destination comprises a storing device that allows a plurality of simultaneous accesses, said checking device determines, after a start of the transfer, whether or not a transfer is allowable by determining whether or not the residual capacity of said destination is zero.

56. An image printing device, comprising:
an image processing apparatus, including
an inputting device comprising an image data storing device, which includes an interface, and configured to receive image data output from at least one of an image reading unit or an outside of said image processing apparatus; and
an image forming device configured to form an image in accordance with the image data output from said image data storing device;
said image data storing device comprising;
at least first and second storing devices different in storing format from each other, each configured to store image data input via said inputting device, said first storing device including an external storage and said second storage device including
at least one of a video memory and a hard drive; a transfer controller configured to control transfer of the image data between said plurality of storing devices, the image data including an arbitrary selection of one or plural or any of files included in the image data, selected by an operator, to be transferred; and
a checking device included in said transfer controller and configured to determine, prior to a start of transfer of said image data from said second storing device to said first storing device, whether or not said external storage of said first storage device, which is included in a destination, to which the image data should be transferred from said second storage device, has a capacity great enough to store said image data of all the files selected by the user to be transferred, the checking device setting a flag when the capacity of said external storage is less than the total capacity of all the files selected by the user to be transferred,
wherein when the flag is set transfer of the files selected by the user is interrupted before a first of the files is started to be transferred.

57. The image printing device of one of claims 1, 19, 38 or 56, further comprising:
a copier device configured to copy an original image to create said image data.

58. The method of claim 20, further comprising: copying an original image to create said image data.

59. A computer program product stored on an computer readable medium and containing instructions configured to cause a processor-based device to execute the method recited in any one of claims 20-37 or 58.

* * * * *